United States Patent [19]

Wakabayashi, deceased et al.

[11] 4,391,530
[45] Jul. 5, 1983

[54] ELECTRONIC TIMEPIECE

[75] Inventors: Takuo Wakabayashi, deceased, late of Saitama, Japan; by Shigemasa Wakabayashi, legal representative, Nagano, Japan; Iwao Tahara, Higashiyamato, Japan; Toshiharu Aihara, Kodaira, Japan; Naoki Takahashi, Fussa, Japan; Yushin Matsuo, Chofu, Japan

[73] Assignee: Casio Computer Co., Ltd., Tokyo, Japan

[21] Appl. No.: 188,515

[22] Filed: Sep. 18, 1980

[30] Foreign Application Priority Data

| Sep. 27, 1979 | [JP] | Japan | 54-126264 |
| Dec. 6, 1979 | [JP] | Japan | 54-158983 |
| Dec. 6, 1979 | [JP] | Japan | 54-158986 |
| Dec. 11, 1979 | [JP] | Japan | 54-161292 |
| Dec. 11, 1979 | [JP] | Japan | 54-161293 |
| Dec. 11, 1979 | [JP] | Japan | 54-161294 |
| Dec. 12, 1979 | [JP] | Japan | 54-161813 |

[51] Int. Cl.³ .................... G04B 21/08; G11C 13/00
[52] U.S. Cl. ........................... 368/63; 368/73; 368/75; 365/45; 369/23; 179/1 SM
[58] Field of Search ............... 360/8, 32; 369/20, 23; 368/62, 63, 72–75, 250–251, 272–273, 41–43; 364/705, 710; 179/1 SA, 1 SM

[56] References Cited

U.S. PATENT DOCUMENTS

| 3,919,834 | 11/1975 | Murakami et al. | 369/20 X |
| 3,998,045 | 12/1976 | Lester | 368/63 |
| 4,147,021 | 4/1979 | Kondo | 368/251 |
| 4,318,188 | 3/1982 | Hoffmann | 360/32 |

Primary Examiner—Vit W. Miska
Attorney, Agent, or Firm—Frishauf, Holtz, Goodman & Woodward

[57] ABSTRACT

An electronic timepiece, which comprises a circuit for encoding an externally supplied voice and a semiconductor memory for memorizing the encoded voice data. The voice data memorized in the semiconductor memory is read out when a preset time is reached, and the data thus read out is converted into a voice signal which is coupled to a sound producing device such as a loudspeaker for the reproduction of the voice.

18 Claims, 54 Drawing Figures

F I G. 10A
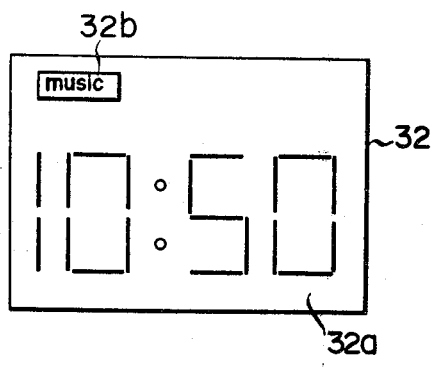
F I G. 10B
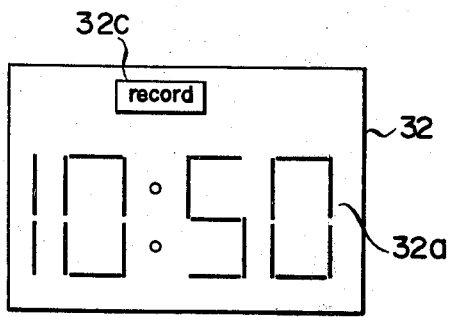
F I G. 10C
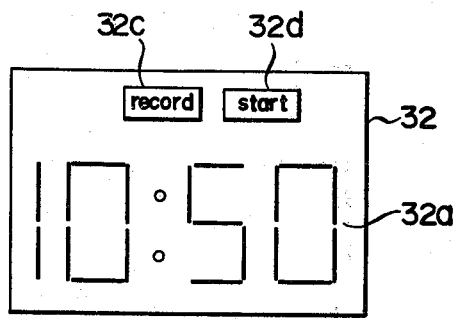

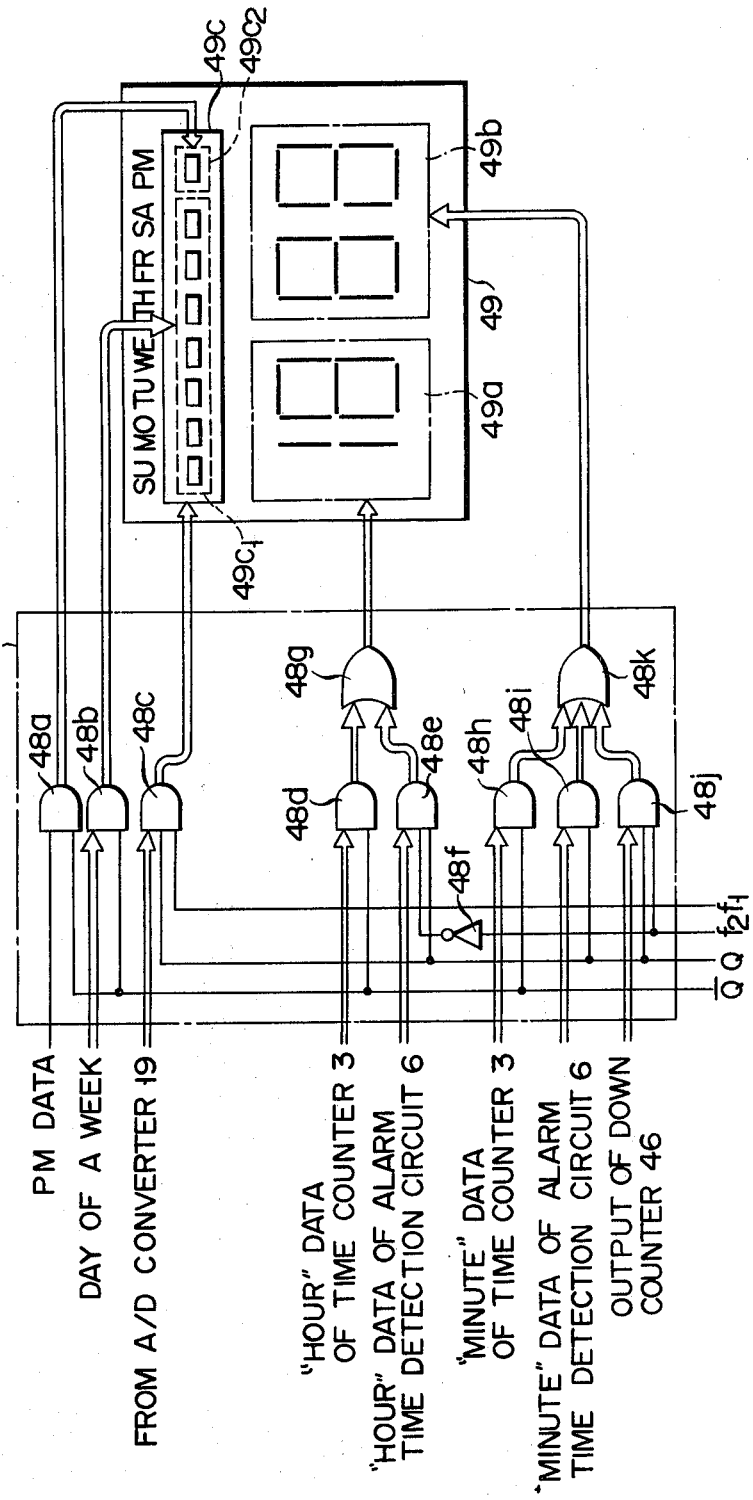

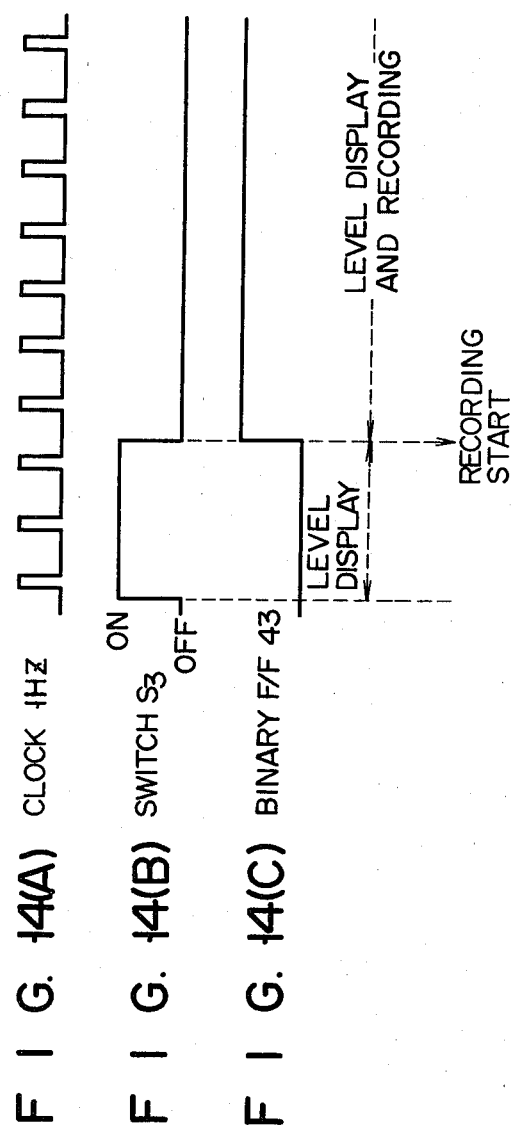
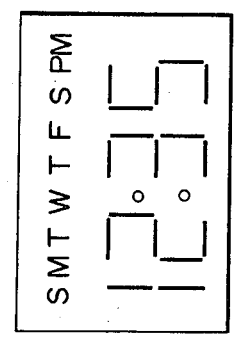
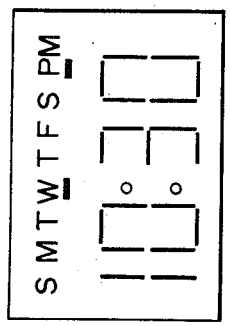

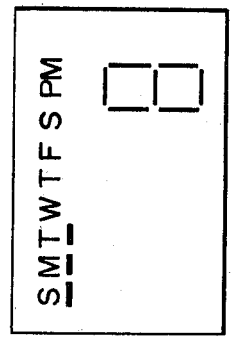
FIG. 16(A)
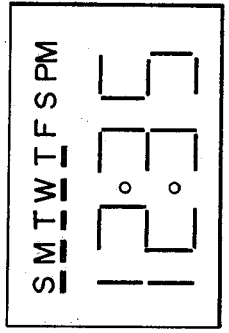
FIG. 16(B)
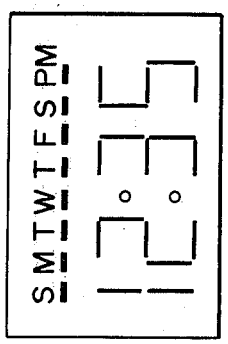
FIG. 16(C)
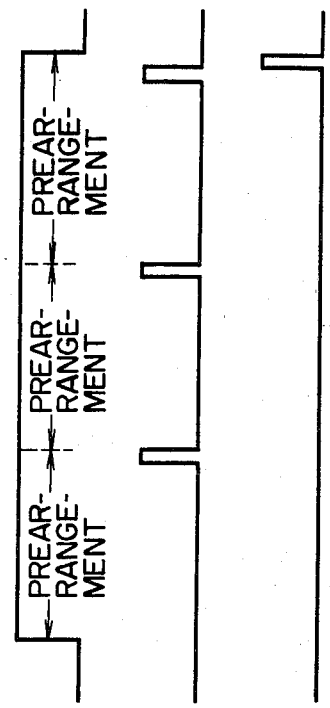
FIG. 18(A) COINCIDENCE SIGNAL AL
FIG. 18(B) Q-OUTPUT OF FLIP-FLOP 55
FIG. 18(C) CARRY SIGNAL OF ADDRESS COUNTER 54
FIG. 18(D) 3C-COUNTER

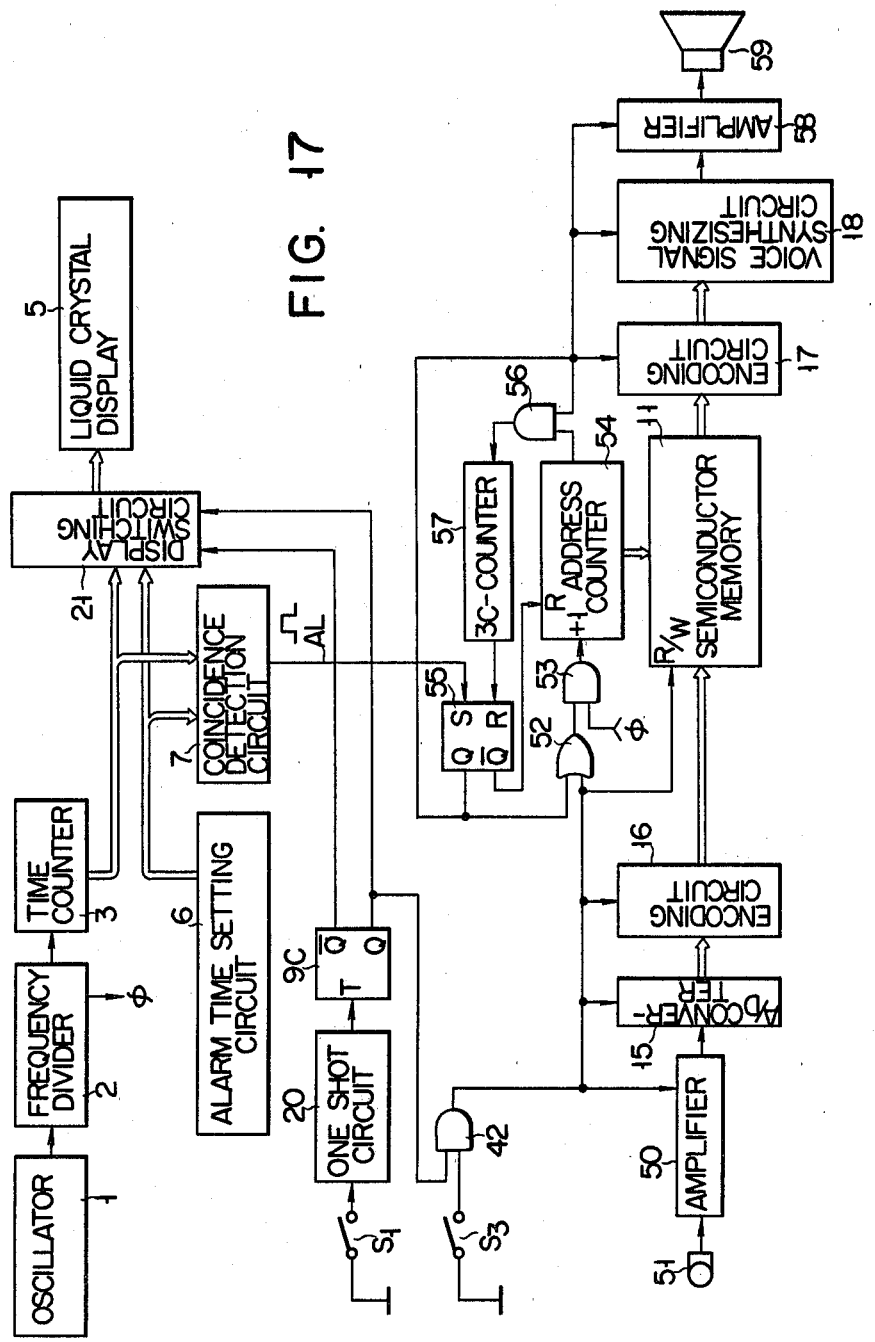

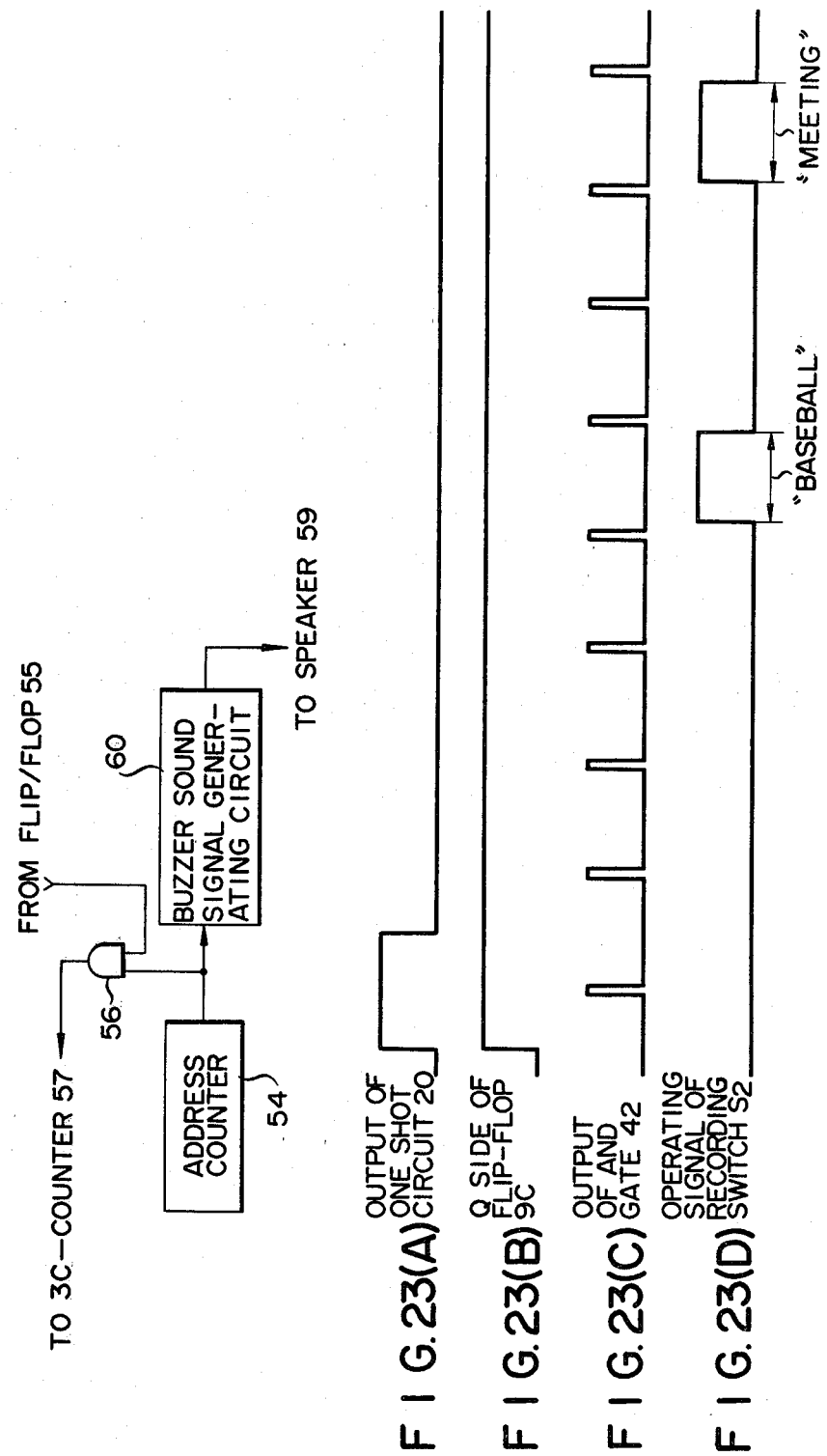

F I G. 29
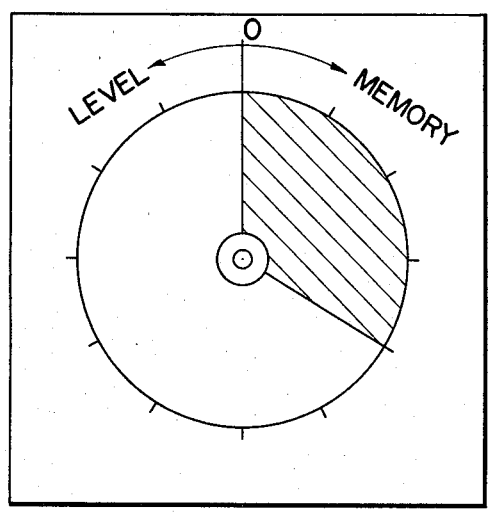
F I G. 30
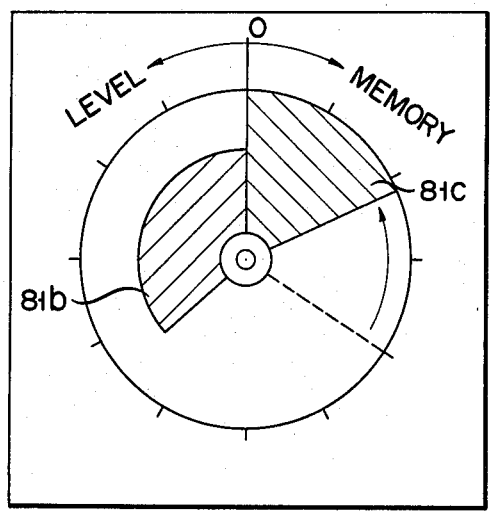

F I G. 31 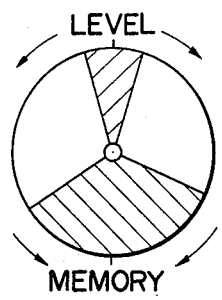
F I G. 32 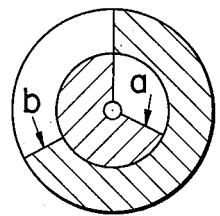
F I G. 33(A) 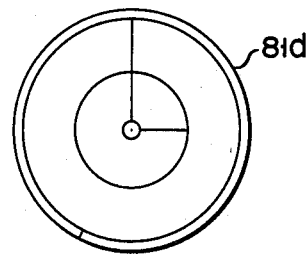   F I G. 33(B) 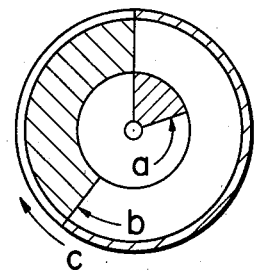

ELECTRONIC TIMEPIECE

This invention relates to electronic timepiece provided with a recording function, i.e., a function of recording and reproducing voice or sound.

Recently, electronic timepieces having multiple functions have been developed, and those having, for instance, an alarm function are available. The alarm function is to produce a single sound at a predetermined frequency or a well-known number of music at the time of reaching of an alarm time. In this way, a desired time can be informed of. However, as the alarm sound only a sound or a piece of music determined by the manufacturer is produced, and such a sound or piece of music is liable to fail to meet the taste of the user of the timepiece or soon become boring. In addition, there is such an inconvenience that it sometime happens that the user of the timepiece cannot think of what is to be done when he hears the alarm sound produced at the alarm time, that is, the scheduled item or content for which the alarm time is set has to be memorized by the user.

This invention is intended in the light of the above affairs, and its object is to provide an electronic timepiece, which has such a recording function that not only a desired voice or sound can be externally supplied readily and reliably but also the coupled voice or sound data can be readily read out according to a signal from a time counter circuit to reproduce the voice or sound.

To achieve the above object, according to the invention there is provided an electronic timepiece comprising a time counter means for obtaining time data by counting a reference frequency signal, a time display means for displaying said time data obtained from said time counter means, an alarm signal generating means for producing an alarm signal when said time data obtained from said time counter means comes to correspond to a predetermined time instant, a semiconductor memory for writing therein voice data based upon an externally coupled voice, and a voice data writing instructing means for producing an instruction to write said voide data in said semiconductor memory, and a voice reproducing means for reproducing voice by reading out said voice data memorized in said semiconductor memory according to the instruction from said voice data writing instruction generating means when said alarm signal is supplied from said alarm signal generating means.

Thus, according to the invention it is not only possible to incorporate the recording function in a small-sized timepiece such as a wristwatch but also what it to be done at the alarm time can be immediately known since the recorded content is pronounced as the alarm sound at the alarm time, and it is possible to provide a timepiece which is very convenient and useful in practice.

This invention can be more fully understood from the following detailed description when taken in conjunction with the accompanying drawings, in which:

FIGS. 10A, 10B and 10C are views showing respective display states of a liquid crystal display section shown in FIG. 7;

FIG. 13 is a view showing a display switching circuit and a liquid crystal display section in FIG. 12 in detail;

FIGS. 14A, 14B and 14C are a time chart illustrating the operation of the circuit of FIG. 13;

FIGS. 15A and 15B are views showing respective examples of the display in the liquid crystal display section shown in FIG. 13;

FIGS. 16A, 16B and 16C are views showing respective other examples of the display in the liquid crystal display section;

FIG. 17 is a block diagram showing a yet further embodiment of the invention;

Figure 20:
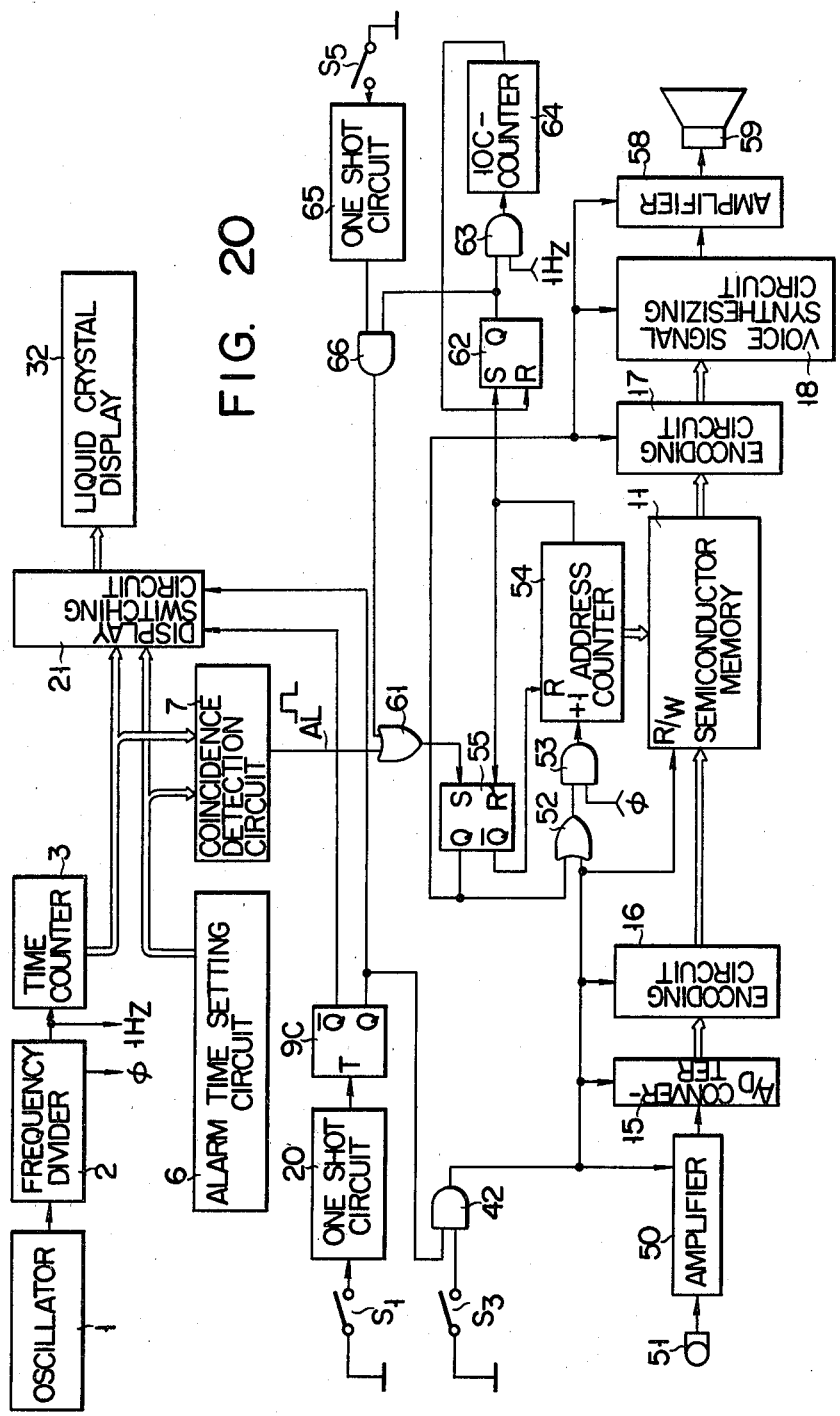
Figure 22:
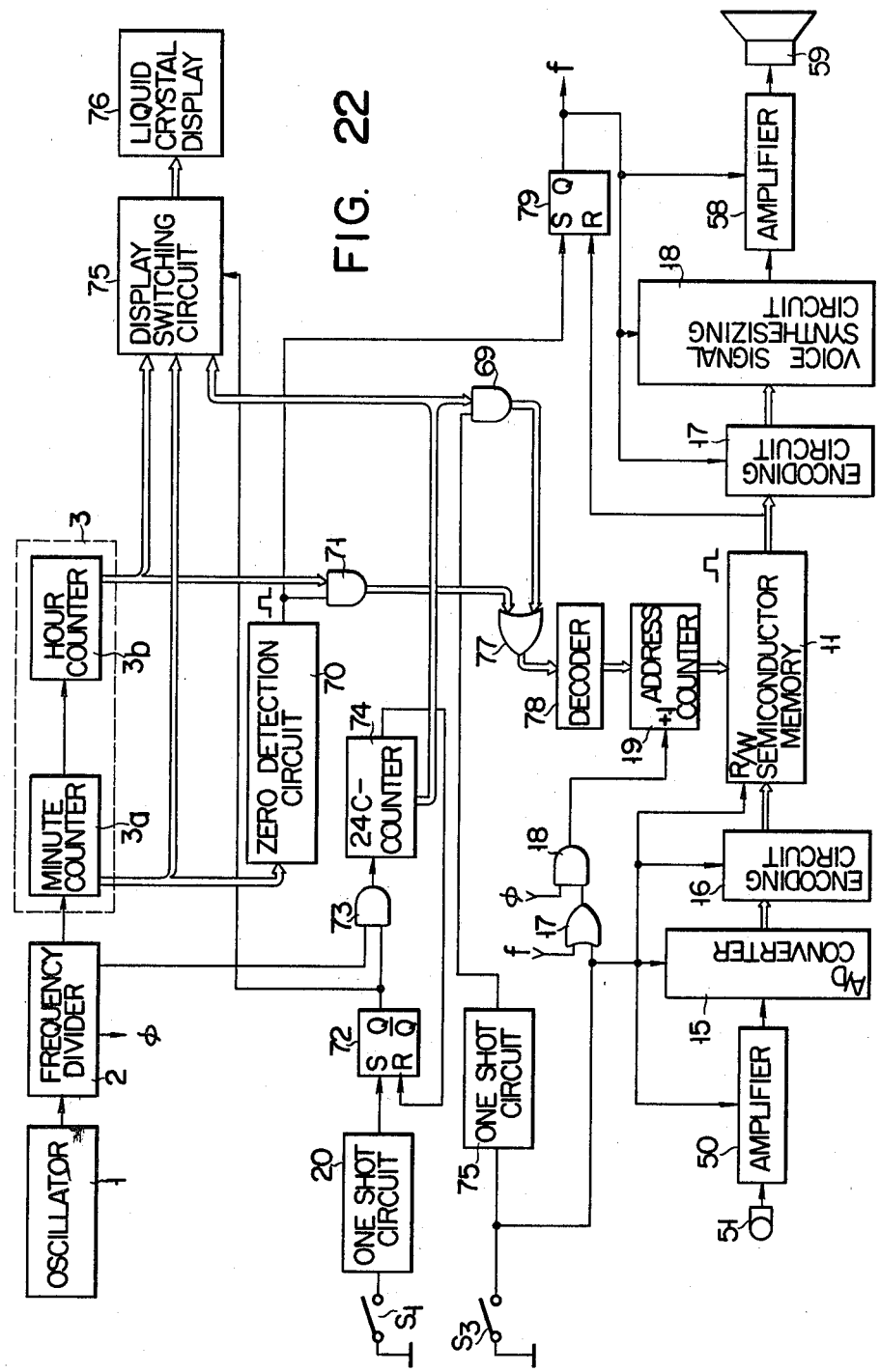
Figure 24:
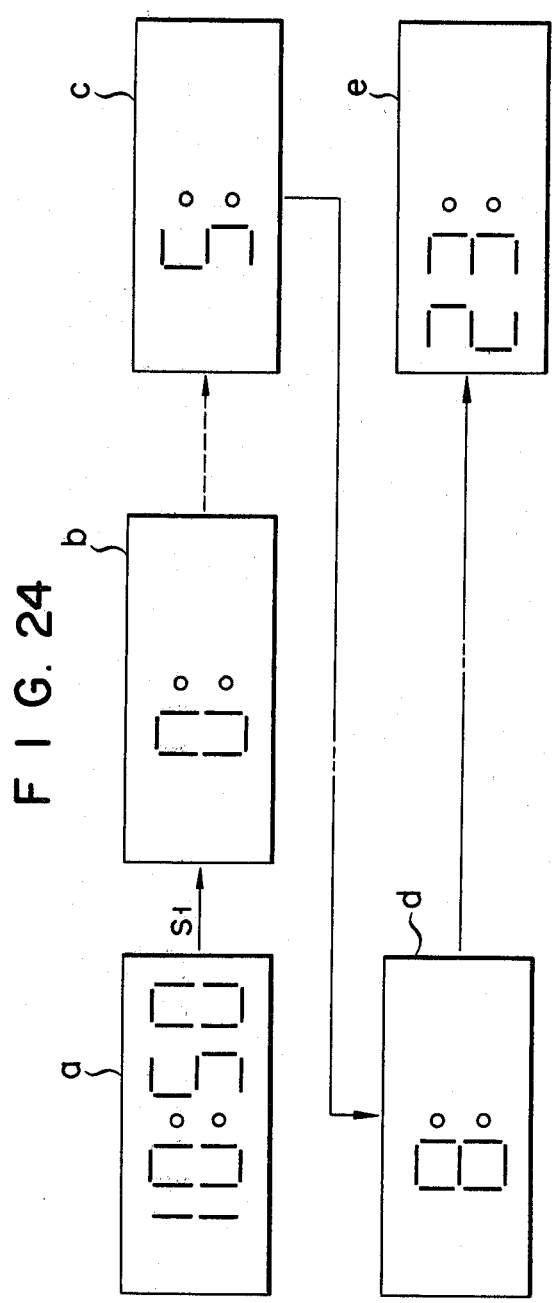
Figure 25B:
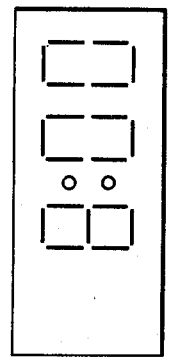
Figure 25A:
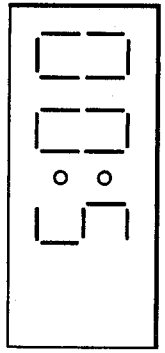
Figure 26:
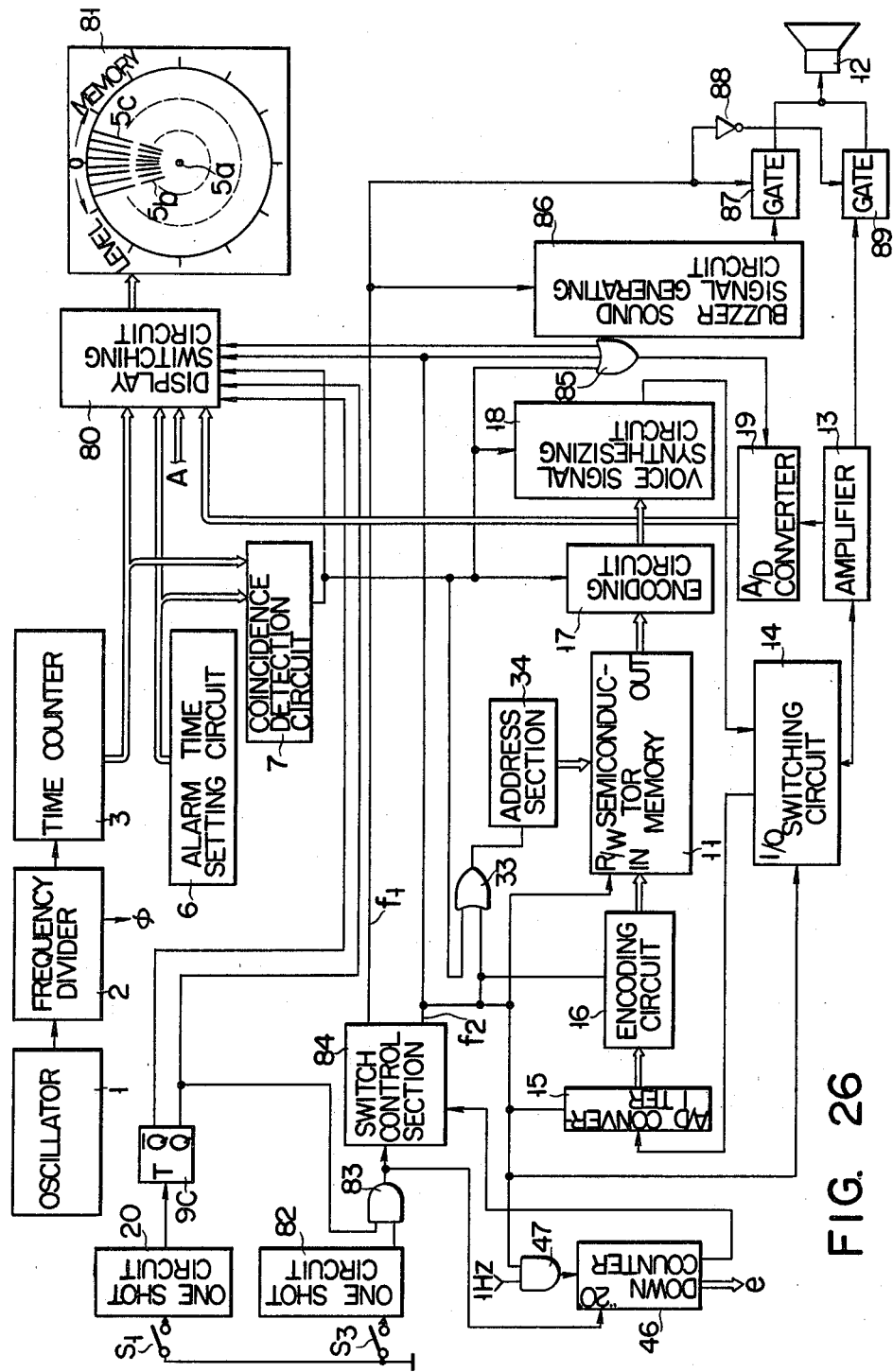
Figure 27:
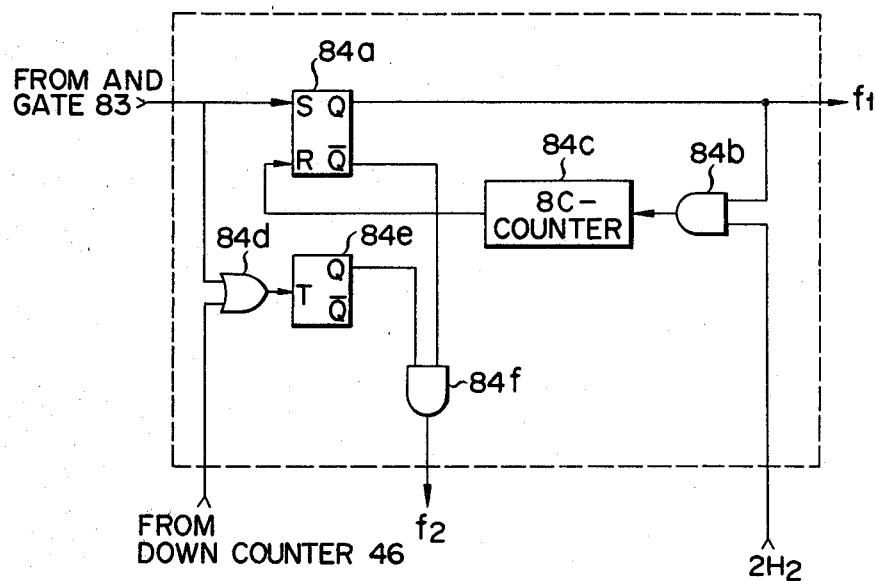
Figure 28:
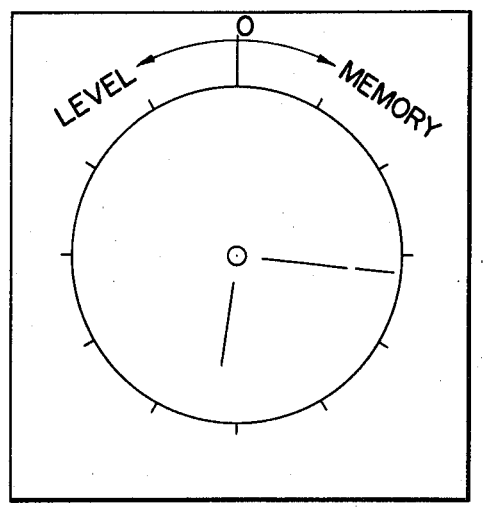

FIGS. 18A, 18B, 18C and 18D form a time chart illustrating the operation of the circuit of FIG. 17;

FIG. 19 is a view showing a modification of part of the embodiment of FIG. 17;

FIG. 20 is a block diagram showing a further embodiment of the invention;

FIGS. 21A, 21B, 21C, 21D, 21E, 21F and 21G form a time chart illustrating the operation of the circuit of FIG. 20;

FIG. 22 is a block diagram showing a yet another embodiment of the invention;

FIGS. 23A, 23B, 23C and 23D form a time chart illustrating the operation of the circuit of FIG. 22;

FIG. 24 is a view showing various display states of a liquid crystal display section shown in FIG. 22;

FIGS. 25A and 25B are views showing other examples of the display in the liquid crystal display section shown in FIG. 22;

FIG. 26 is a block diagram showing a further embodiment of the invention;

FIG. 27 is a circuit diagram showing the detailed circuit construction of a switch control section shown in FIG. 26;

FIGS. 28, 29 and 30 are views showing examples of the display in a liquid crystal display section shown in FIG. 26; and FIGS. 31, 32, 33A and 33B are views showing examples of the display in modifications of the liquid crystal display section shown in FIG. 26.

Now, preferred embodiments of the invention will be described with reference to the accompanying drawings.

Figure 1:
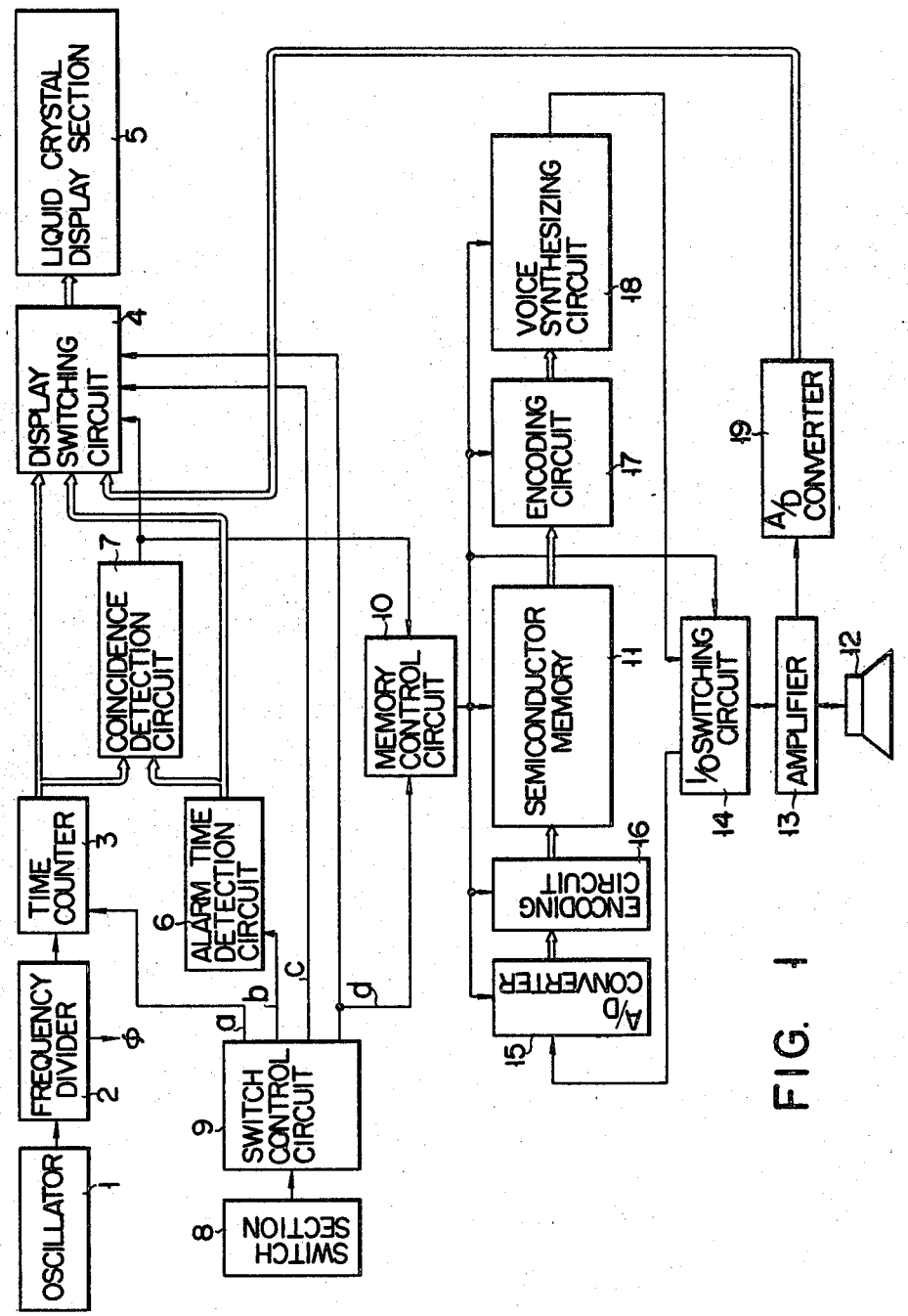
FIG. 1 is a block diagram showing the circuit of an embodiment of the electronic timepiece according to the invention.

FIG. 1 shows the circuit construction of an embodiment of the invention applied to an electronic timepiece. Referring to FIG. 1, reference numeral 1 is an oscillator to produce a reference frequency signal. The reference frequency signal is coupled to a frequency divider 2 for frequency division to produce a signal with a period of one second which is coupled to a time counter 3. The time counter 3 counts time data such as the "hour", "minute" and "second" data and also provides such calendar data as the data and day of a week. The data obtained from the time counter 3 is supplied through a display switching circuit 4 to a liquid crystal display section 5. It is also supplied to a coincidence detection circuit 7, to which alarm time data from an alarm time setting circuit 6 is also supplied. The alarm time setting circuit 6 permits the user of the timepiece to set a desired alarm time, and the alarm time data memorized in this circuit 6 is supplied to the display switching circuit 4. The coincidence detection circuit 7 produces an alarm signal AL when it detects the coincidence of the time data from the time counter 3 and the alarm time data from the alarm time setting circuit 6. The alarm signal AL thus produced is supplied as a display switching signal to the display switching circuit 4. Reference numeral 8 is a switch section having three, externally operable switches, and a switch operation signal from this switch section 8 is supplied to a switch control circuit 9.

Figure 2:
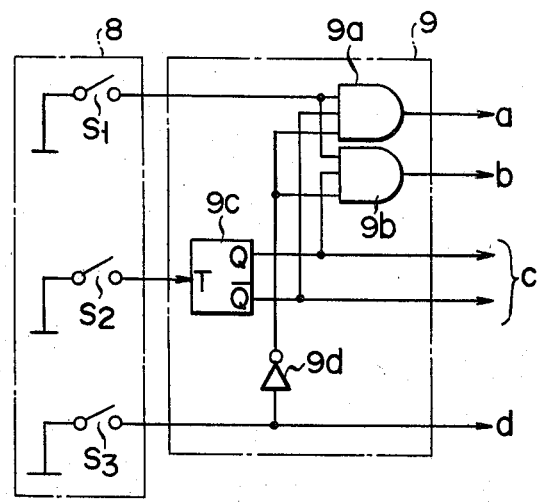
FIG. 2 is a circuit diagram showing a switch section and a switch control section shown in FIG. 1.

FIG. 2 shows the detailed construction of the switch section 8 and switch control circuit 9. As mentioned earlier, the switch section 8 has three switches $S_1$, $S_2$ and $S_3$. A switch operation signal produced when the time setting switch $S_1$ is operated, is supplied to AND gates 9a and 9b in the switch control circuit 9. To the AND gates 9a and 9b are also supplied respective $\bar{Q}$ and Q side outputs of a binary flip-flop 9c, these outputs being inverted every time the switch $S_2$, which is a display select switch, is operated. A switch operation signal produced when the switch $S_3$ is operated is supplied through an inverter 9d to the AND gates 9a and 9b. The output signals of the AND gates 9a and 9b are supplied as corrected setting signals a and b to the time counter 3 and alarm time setting circuit 6 respectively, and the $\bar{Q}$ and Q side output signals of the flip-flop 9 are supplied as display switching signal c to the display switching circuit 4. The switch $S_3$ is a recording switch, and the switch operation output d therefrom is supplied to a memory control section 10 to be described later as well as to the display switching circuit 4. The switch control circuit 9 selectively specifies either time counter 3 or alarm time setting circuit 6 when the display select switch $S_2$ in the switch group 8 is operated, and when the time setting switch $S_1$ is operated the circuit 9 supplies the time setting signal a to the time counter 3 and the alarm time setting signal b to the alarm time setting circuit 6 to effect the setting of time. When the display select switch $S_2$ is operated, the circuit 9 supplies the display switching signal c to the display switching circuit 4, and when the recording switch $S_3$ is operated it supplies a write instruction d to the memory control circuit 10 and also the display switching signal c to the display switching circuit 4.

To the memory control circuit 10 are supplied the write instruction d produced when the recording switch $S_3$ is operated and also the alarm signal AL produced from the coincidence detection circuit 7. When the memory control circuit 10 receives the signal d from the switch control circuit 9, it supplies a write instruction signal to a semiconductor memory circuit 11, while when it receives the alarm signal AL from the coincidence detection circuit 7 it supplies a read instruction signal to the semiconductor memory circuit 11. The semiconductor memory circuit 11 is constructed with, for instance, a shift register, a RAM (random access memory) or P-ROM (programmable read only memory), etc. It is rendered into a write or read mode by the write or read instruction signal from the memory control circuit 10 and effects a writing or reading operation according to a predetermined frequency signal $\phi$ from the frequency divider 2.

Figure 3:
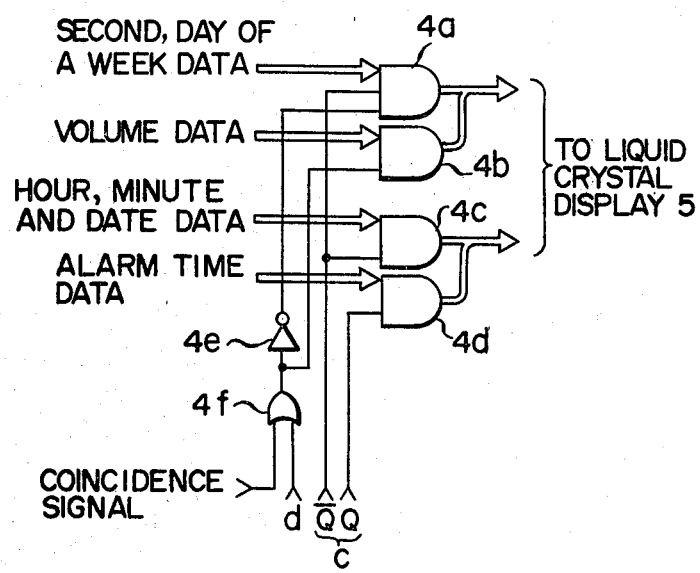
FIG. 3 is a circuit diagram showing a display switching circuit shown in FIG. 1.

Reference numeral 12 in FIG. 1 is a microphone-loudspeaker, which is connected through an amplifier 13 to an input/output (I/O) switching circuit 14. The I/O switching circuit 14 is supplied with the write and read instruction signals from the memory control circuit 10. When it receives the write instruction signal it operates as an input circuit, while with the read instruction signal received it acts as an output circuit. When the I/O circuit 14 is operating as the input circuit, a voice signal supplied from the microphone-loudspeaker 12 is inputted into the I/O circuit 14 through the amplifier 13 to an analog-to-digital (A/D) converter 15. The A/D converter 15 converts the input voice signal, which is an analog signal, into a corresponding digital signal which is supplied to an encoding circuit 16. The encoding circuit 16 encodes the digitally converted voice signal input to produce an interval code, a volume code, etc. The encoded signal is successively written in the semiconductor memory 11. The A/D converter 15 and encoding circuit 16 are rendered operative only when the write instruction signal is supplied from the memory control circuit 10. With the read instruction from the memory control circuit 10 the voice information is successively read out from the semiconductor memory 11 in the same order as that of its writing and supplied through an encoding circuit 17, which effects an opposite encoding to that of the encoding circuit 16, to a voice signal synthesizing circuit 18. The voice signal synthesizing circuit 16 synthesizes the original voice signal from the encoded signal from the encoding circuit 17, and the voice signal obtained is supplied to the I/O switching circuit 14. The encoding circuit 17 and voice synthesizing circuit 18 are supplied with the read instruction signal from the memory control circuit 10. When the read instruction signal is provided from the memory control circuit 10, the I/O switching circuit 14 issues the voice signal from the voice signal synthesizing circuit 18 through the amplifier 13 to the microphone-loudspeaker 12. Also, the amplified voice signal output of the amplifier 13 is supplied to the A/D converter 19 for conversion of the volume level into a digital signal which is supplied to the display switching circuit 4. The display switching circuit 4 has a construction as shown in FIG. 3. The second and day of a week data from the time counter 3 are supplied to an AND gate 4a, and the hour, minute and date data are supplied to an AND gate 4c. The alarm time data from the alarm time setting circuit 6 is supplied to an AND gate 4d, and the volume data from the A/D converter 18 is supplied to an AND gate 4b. Further, the Q side output signal of the binary flip-flop 9c shown in FIG. 2 is supplied to the AND gates 4a and 4c, while the Q side output signal of the binary flip-flop 9c is supplied to the AND gate 4d. The switch operation signal d produced when the recording switch $S_3$ and the alarm signal from the coincidence detection circuit 7 are inputted to an OR gate 4f and hence supplied directly to the AND gate 4b and also through an inverter 4e to the AND gate 4a.

Figure 4:
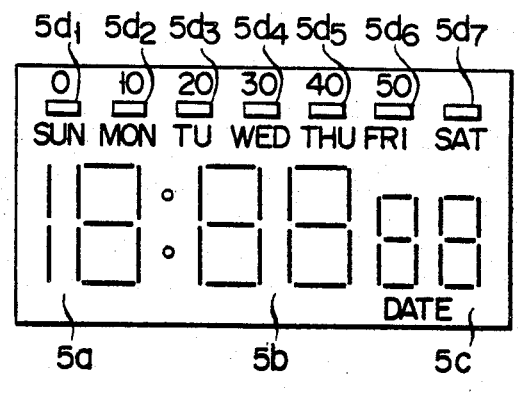
FIG. 4 is a view showing a liquid crystal display section shown in FIG. 1.

FIG. 4 shows the construction of the liquid crystal display section 5. As is shown, it consists of a digital display section including an hour display section 5a, a minute display section 5b and a date display section 5c and an analog display section including seven second/- day of a week/volume display sections $5d_1$ to $5d_7$ arranged in a row for displaying each of these data analogwise. The output data from the AND gates 4a and 4b in FIG. 3 is supplied to the analog display section in the liquid crystal display section 5, while the output data from the AND gates 4c and 4d is supplied to the digital display section.

Figure 5:
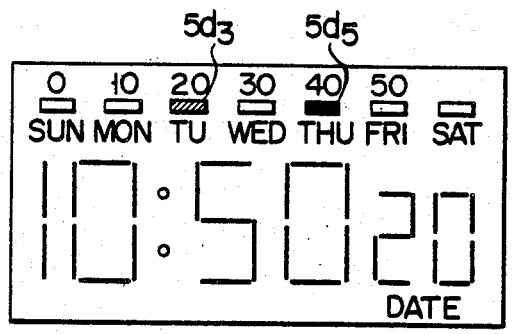
FIG. 5 is a view showing an example of the display in the liquid crystal display section.

With the electronic timepiece of the above construction, in the reset state of the binary flip-flop 9c on the switch control circuit 9 shown in FIG. 2 the AND gates 4a and 4c in the display switching circuit 4 are open, so that time data as shown in FIG. 5 is displayed in the display section 5. In this example, an hour data "10" is displayed in the hour display section 5a, a minute data "50" is displayed in the minute display section 5b, and a date data "20" is displayed in the date display section 5c. Also, in the analog display section the display section $5d_5$ is "on" to indicate, for instance, Thursday and the display section $5d_3$ is blinked to indicate, for instance, that twenty seconds have passed from the displayed minute instant.

Figure 6:
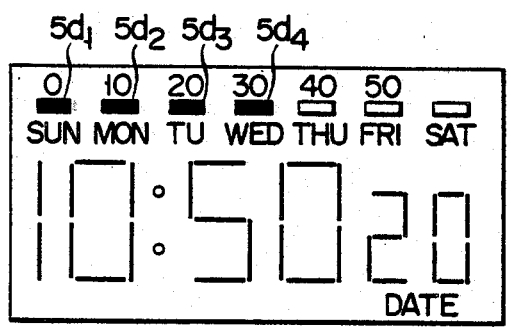
FIG. 6 is a view showing another example of the display in the liquid crystal display section.

For writing voice data in the semiconductor memory 11, the recording switch $S_3$ in the switch section 8 is operated. While the recording switch $S_3$ is being operated, the signal d is supplied from the switch control circuit 9 to the memory control circuit 10 and also to the display switching circuit 4. As a result, the memory control circuit 10 issues the write instruction signal. Thus, the semiconductor memory 11 is set to the write mode, the I/O switching circuit 14 is rendered to act as the input circuit, and the A/D converter 15 and encoding circuit 16 are rendered operative. In this state, what is scheduled for the alarm time, for instance, a "meeting", is accurately pronounced to the microphone-loudspeaker 12. Then, the voice signal produced from the microphone-loudspeaker 12 is supplied through the amplifier 13 and I/O switching circuit 14 to the A/D converter 15 for conversion into a digital signal, which is then encoded in the encoding circuit 16 and memorized in the semiconductor memory 11. Meanwhile, the voice signal produced through the microphone-loudspeaker 12 and amplifier 13 is supplied to the A/D converter 19 for conversion into a digital signal which is supplied through the AND gate 4b in the display switching circuit 4, which AND gate 4b is opened by the signal d, to the display section 5. Thus, in the display section 5, some of the second/day of a week/volume display sections $5d_1$ to $5d_7$, for instance sections $5d_1$ to $5d_5$, are turned on according to the volume information, as shown in FIG. 6. The volume of the input voice is indicated by the corresponding number of the "on" second/day of a week/volume display sections.

When the alarm time preset in the alarm time setting circuit 6 is reached so that the alarm signal AL is produced from the coincidence detection circuit 7, the alarm signal AL is supplied as display switching signal to the display switching circuit 4, while it is also supplied to the memory control circuit 10. As a result, the read instruction signal is produced from the memory control circuit 10. Thus, the semiconductor memory 11 is set to the read mode, the I/O switching circuit 14 is rendered to act as the output circuit, and the encoding circuit 17 and voice signal synthesizing circuit 18 are rendered operative. Consequently, the voice data memorized in the semiconductor memory 11 is encoded in the encoding circuit 17 and supplied to the voice signal synthesizing circuit 18 to produce the voice signal, which is supplied through the I/O switching circuit 14 and amplifier 13 to the microphone-loudspeaker 12, which thus produces an alarm sound. More particularly, at this time the recorded content written in the semiconductor memory 11, i.e., "meeting", is pronounced. Meanwhile, when the voice signal is sent forth through the amplifier 13, the volume of the voice signal is converted through the A/D converter 19 into a digital signal which is supplied through the AND gate 4b of the display switching circuit 4, the AND gate being opened by the alarm signal, to the display section 5. Thus, in the display section 5 predetermined ones of the second/day of a week/volume sections $5d_1$ to $5d_7$ are turned on according to the volume level of the coupled voice, and thus the volume of the output sound is indicated by the number of the "on" second/day of a week/volume display sections.

In the above way, what has to be done at the alarm time, for instance "meeting", can be pronounced by the timepiece at the alarm time. That is, what has to be made at the alarm time can be directly told. Also, at the time of the input or output of the voice, the volume level thereof can be known by sight on the display section. Further, since voice information is written in the semiconductor memory 11 through the microphone-loudspeaker 12, the writing can be made readily and in a short period of time.

Figure 7:
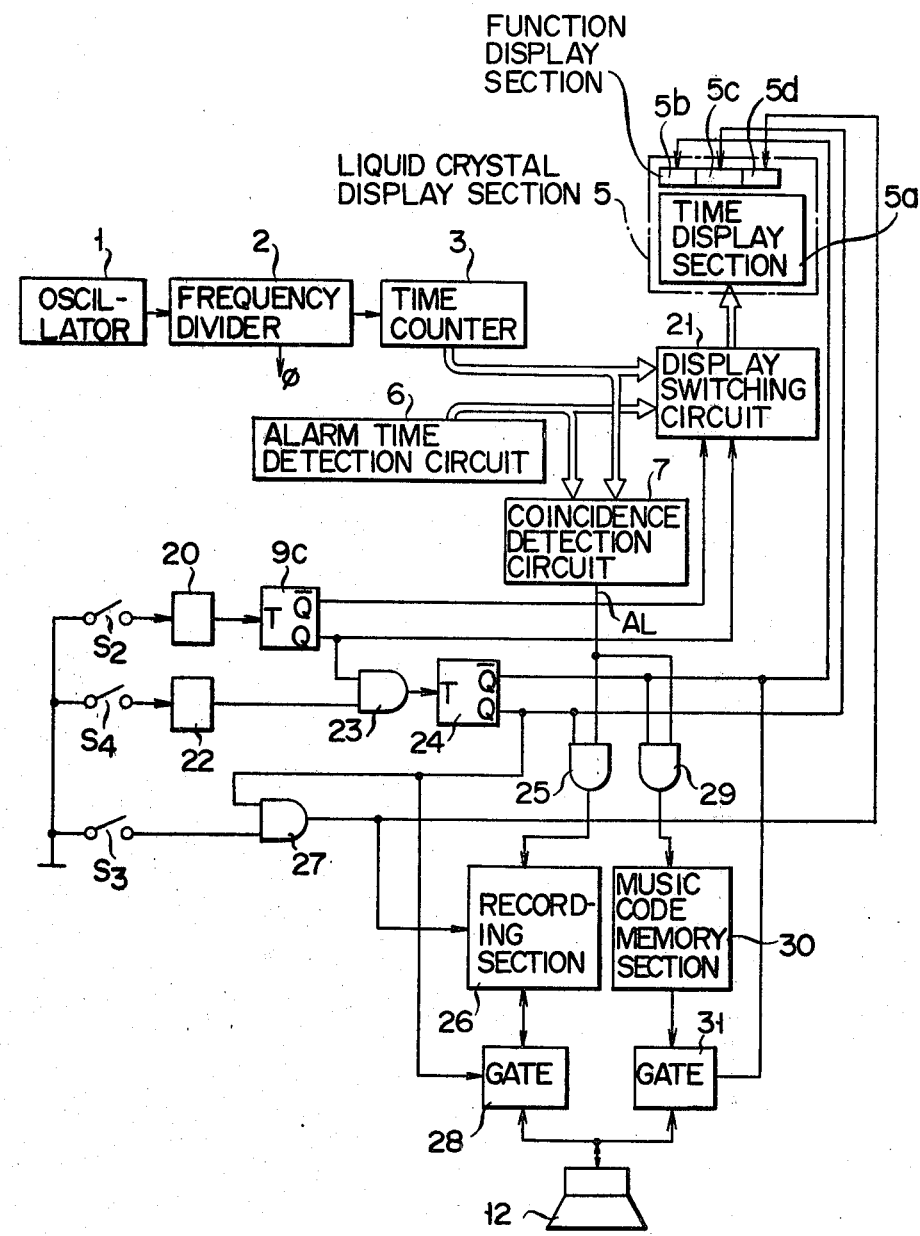
FIG. 7 is a block diagram showing another embodiment of the invention.

FIG. 7 shows another embodiment of the invention. In FIG. 7, like parts as in FIG. 1 are designated by like reference numerals, and their detailed description is omitted here.

In this embodiment, display select switch $S_2$ is connected through a one-shot circuit 20 to the T input terminal of binary flip-flop 9c. The $\bar{Q}$ and Q side output signals of the flip-flop 9c are supplied as display switching control signal to a display switching circuit 21. The display switching circuit 21 supplies time data from the time counter 3 when the $\bar{Q}$ side output signal of the flip-flop 9c is "1" (binary output), while it supplies alarm time data from alarm time detection circuit 6 when the Q side output signal of the flip-flop 9c is "1". A switch $S_4$ is an alarm sound specification switch, which is provided for producing either preset music or externally recorded sound as alarm sound at the alarm time. A switch operation signal produced when the switch $S_4$ is operated is supplied to a one-shot circuit 22 to produce a single pulse. This pulse signal is supplied through an AND gates 23, to which the Q side output signal of the flip-flop 9c is also inputted, to a T input terminal of a binary flip-flop 24 to invert the output state of the flip-flop 24. The Q side output signal of the flip-flop 24 is supplied as gate control signal to an AND gate 25, to which the alarm signal AL is also supplied. The output signal of the AND gate 25 is supplied as read instruction signal to a recording section 26 to be described later. The Q side output signal of the flip-flop 24 is supplied as gate control signal to one of the input terminals of an AND gate 27. To the other input terminal of the AND gate 27 is supplied the switch operation signal produced when the recording switch $S_3$ is operated. The AND gate 27 supplies its output signal to the recording section 26 while the recording switch $S_3$ is being operated. The recording section 26 is connected through a gate 28 to microphone-loudspeaker 12 so that sound from the outside of the timepiece is written in it after coding while it is receiving the output signal of the AND gate 27. The $\bar{Q}$ side output signal of the flip-flop 24 is supplied as control signal to the gate circuit 28.

The $\bar{Q}$ side output signal of the flip-flop 24 is also supplied as gate signal to an AND gate 29, to which the alarm signal AL is also supplied. The output signal of the AND gate 29 is supplied as read instruction signal to a music code memory section 30 to be described later. In the music code memory section 30 various music codes for forming a predetermined piece of music are memorized, and these music codes are read out when the output signal of the AND gate 29 is received. The music code memory section 30 is connected through a gate 31 to the microphone-loudspeaker 12. The $\bar{Q}$ side output signal of the flip-flop 24 is connected as gate opening signal to the gate circuit 31.

A liquid crystal display section 5 includes a time display section 5a and three function display sections 5b, 5c and 5d. In the time display section 5a the output data from the display switching circuit 21 is digitally displayed. In the function display section 5b, with the $\bar{Q}$ side signal inputted thereto as display drive signal from the flip-flop 24 characters "music" are displayed to indicate that the alarm sound produced at the alarm time is that which is memorized in the music code memory section 30. In the function display section 5c, with the Q side signal inputted thereto as the display drive signal to the flip-flop 24 characters "record" are displayed to indicate that the alarm sound produced at the alarm time is that which is memorized in the recording section 26. In the function display section 5d with the output signal of the AND gate 27 inputted thereto as display drive signal characters "start" are displayed. In the state in which the characters "record" are displayed, with the operation of the switch S₃ the display "start" is made together with the display "record" to indicate the state in which the recording is being made.

Figure 8:
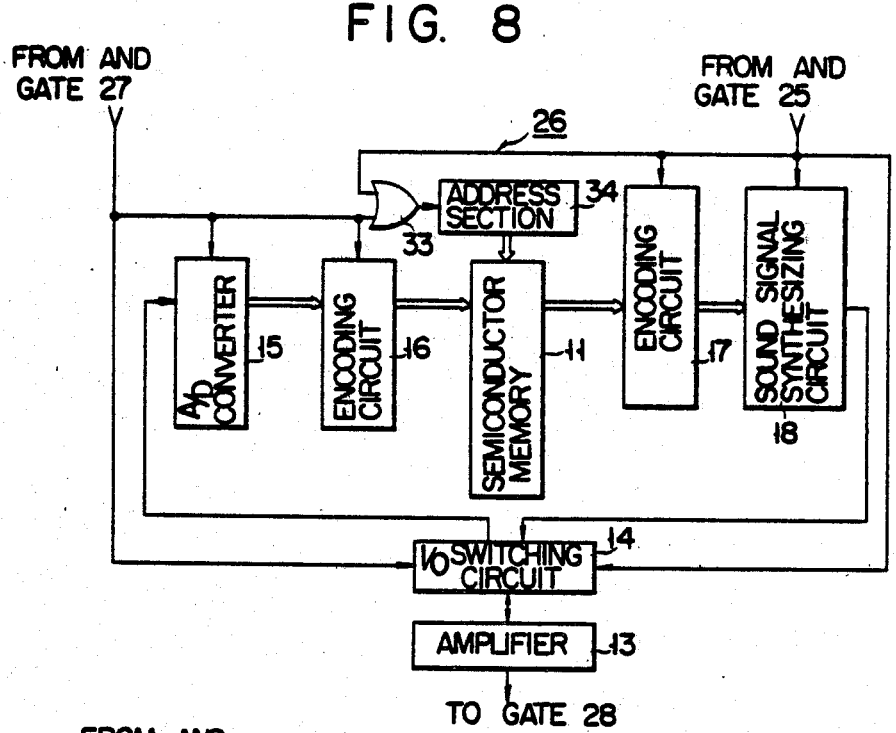
FIG. 8 is a block diagram showing a recording section shown in FIG. 7.

FIG. 8 shows the circuit construction of the recording section 26 in detail. In the Figure, the way of writing in and reading out the voice data of the semiconductor memory 11 is shown in more detail than that in FIG. 1. The write instruction signal from the AND circuit 27 is supplied to the I/O switching circuit 14 and lets the circuit 14 act as the input circuit. Also, it is supplied as operation instruction signal to the A/D converter 15 and encoding circuit 16, and is supplied as address step signal through an OR gate 33 to an address section 34. Further, the read instruction signal from the AND gate 25 is supplied to the OR gate 33, encoding circuit 17, sound signal synthesizing circuit 18 and I/O switching circuit 14.

Figure 9:
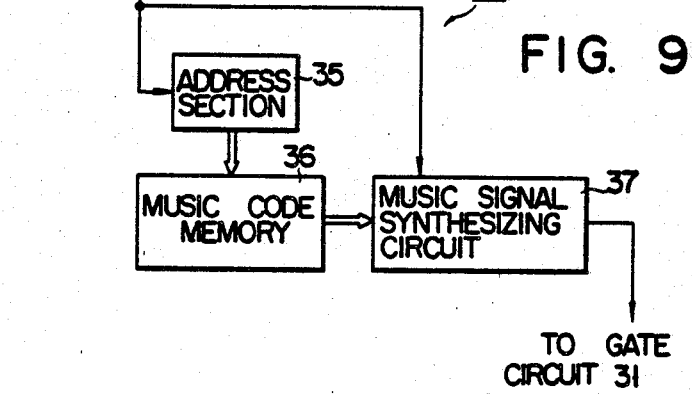
FIG. 9 is a block diagram showing a music code memory section in FIG. 7.

FIG. 9 shows the circuit construction of the music code memory section 30 in detail. The read instruction signal from the AND gate 29 is supplied to the address section 35 to let address data be successively output therefrom. The address data is supplied to the music code memory 36 to specify the corresponding address. In the music code memory 36 music codes for forming a predetermined piece of music are memorized, and music codes memorized in the specified address or addresses are successively read out and supplied to the music signal synthesizing circuit 30. The output signal of the AND gate 29 is supplied as operation signal to the music signal synthesizing circuit 37. The music signal synthesizing circuit 37 synthesizes a predetermined music signal from the musical codes from the music code memory 36 on the basis of the aforementioned predetermined frequency signal $\phi$ supplied from the frequency divider 2, and the music signal thus obtained is supplied to the gate circuit 31.

The operation of the electronic timepiece of the construction shown in FIG. 7 will now be described. When the output signal from the $\bar{Q}$ side output terminal of the flip-flop 9c is "1", the display switching circuit 21 issues the time information of the time counter 3 to the time display section 32a so that the usual present time is displayed in the time display section 32a. When the display select switch S₂ is operated in this state, the output state of the flip-flop 9c is inverted by the pulse signal from the one-shot circuit 20, so that the "1" signal is produced from the Q side output terminal. As a result, the display switching circuit 21 produces the alarm time data (for instance "10:50") preset in the alarm time setting circuit 6 to the time display section 32, so that the alarm time "10:50" is displayed in the time display section 32a as shown in FIG. 10A. If at this time the "1" signal is being produced from the Q side output terminal of the flip-flop 9c, this "1" signal is supplied as the display drive signal to the function display section 32b, so that the characters "music" are displayed as shown in FIG. 10A, thus permitting the operator using the timepiece to confirm that the alarm sound that will be produced at the time of reaching of the alarm time is the music sound permanently memorized in the music code memory section 30.

When the switch S₄ is operated in the above state, i.e., in the state of presence of the "1" signal from the Q side output terminal of the flip-flop 9c, a pulse is produced from the one-shot circuit 22 and supplied through the AND gate 23 to the flip-flop 24 to invert the output state thereof. Thus, the "1" signal is produced from the Q side output terminal of the flip-flop 24 and supplied as display drive signal to the function display section 5c, so that the characters "record" are displayed as shown in FIG. 10B, indicating that the alarm sound that will be produced at the time of reaching of the alarm time is the sound written in the recording section 26.

When the recording switch S₃ is operated, the write instruction signal from the AND gate 27 is supplied to the recording section 26 during the period which the switch S₃ is being operated. Thus, in the recording section 26 the semiconductor memory circuit 11 is given address designation from the address section 34, the I/O switching circuit 14 is rendered to act as the input circuit, and the A/D converter 15 and encoding circuit 16 are rendered into the operative state. In this state, that is to be scheduled for the alarm time, for instance "meeting" or "rendezvous", is correctly spoken to the microphone-loudspeaker 12. As a result, the voice signal coupled through the microphone-loudspeaker 12, amplifier 13 and I/O switching circuit 14 is converted by the A/D converter 15 into a digital signal and then encoded in the encoding circuit 16 for writing in the semiconductor memory 11. Thus, the voice "meeting", "rendezvous", etc. are recorded in the semiconductor memory 11.

When the alarm time is reached, the coincidence detection circuit 7 shown in FIG. 7 produces the alarm coincidence signal AL, which is supplied to the AND gates 25 and 29. At this time, if it is set such that the music sound memorized in the music code memory section 30 is produced as the alarm sound, that is, if the "1" signal from the $\bar{Q}$ side output terminal of the flip-flop 24 prevails, the read instruction signal is supplied from the AND gate 29 to the music code memory section 30. Thus, in the music code section 30 a first music code constituting part of the recorded music is read out from the music code memory 11 according to the address designation of the address section 35. As a result, the music signal synthesizing circuit 37 produces a music signal corresponding to the first music code, which music signal is supplied through the gate circuit 31 which is held open by the Q side output signal of the flip-flop 24 to the microphone-loudspeaker 12.

In this way, the first part of the music, for instance a musical sound "A", is produced. Subsequently, second, third and so forth portions of the recorded music are successively produced in the similar way, that is, the music sound is produced.

When it is set such that the sound memorized in the recording section 26 is produced as the alarm sound at the alarm time, that is, when the "1" signal is produced from the Q side output terminal of the flip-flop 24, upon reaching of the alarm time the read instruction signal from the AND gate 25 is produced and supplied to the recording section 26. Thus, when address information of the address section 34 is supplied to the semiconductor memory circuit 11 in the recording section 26, the sound data memorized in the specified addresses is given designation for reading. Also, the encoding circuit 17 and sound synthesizing circuit 18 are rendered operative, and the I/O switching circuit 14 is rendered to act as the output circuit. Thus, the sound data memorized in the address section 34 is successively read out according to the address designation. The sound data thus read out is encoded in the encoding circuit 17 and then send to the sound synthesizing circuit 18 to produce a sound signal, which is produced from the recording section 26 through the I/O switching circuit 14 and amplifier 13. The sound signal produced from the recording section 26 is sent through the AND gate 28, which is held open by the Q side output signal from the flip-flop 24, to the microphone-loudspeaker 12, which thus produce the alarm sound.

In the above way, it is possible to selectively produce as the alarm sound at the alarm time either the permanently memorized piece of music or the desirably recorded sound or voice.

Figure 11:
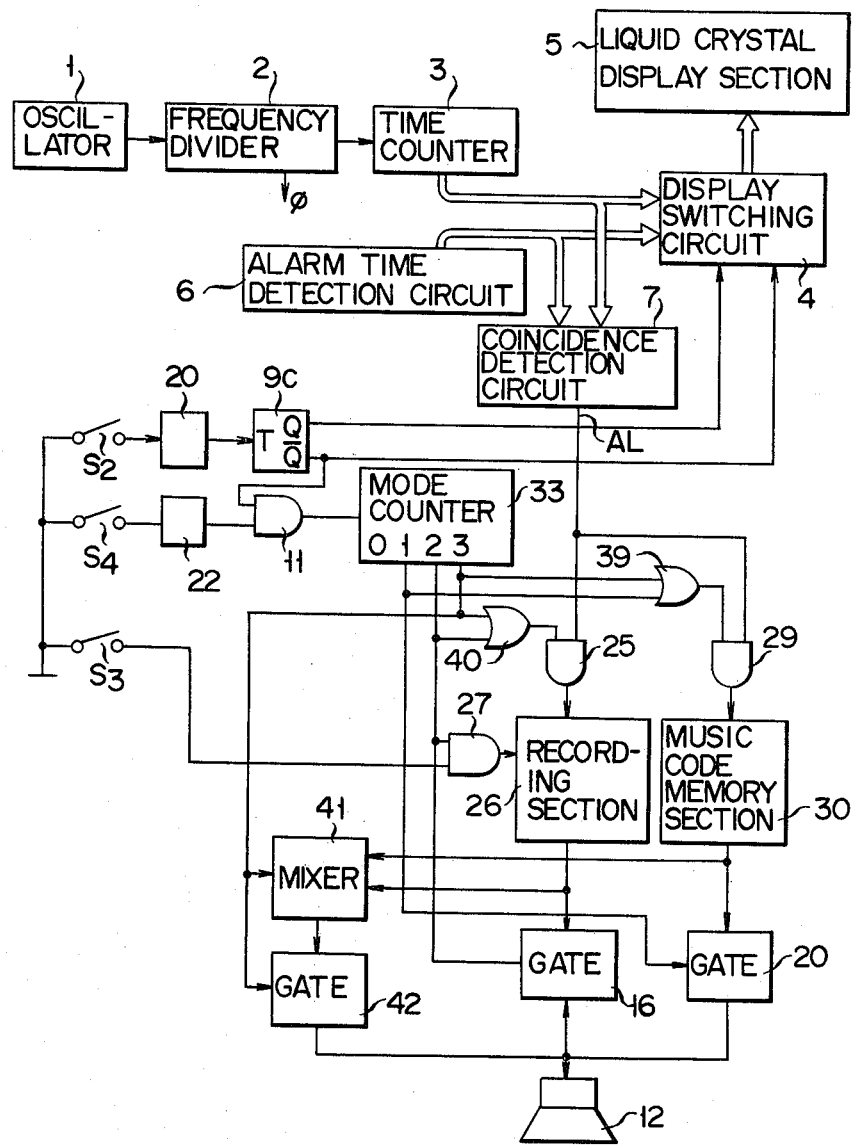
FIG. 11 is a block diagram showing a further embodiment of the invention.

FIG. 11 shows a further embodiment of the invention. In FIG. 11, like parts as those in FIGS. 1 and 7 are designated by like reference numerals, and their description is omitted there. Also, while some further embodiments are shown hereinafter, for example, FIGS. 12, 17, 20, 22 and 26, in all these embodiments like parts as those in FIGS. 1 and 7 are designated by like reference numerals, and their detailed description is omitted. In FIG. 11, designated at 38 a 4-scale of mode counter for setting a sound generation mode. Its content is successively changed to "0", "1", "2", "3", "0", . . . every time it receives a pulse from AND gate 23, and it produces signals for count values "1", "2" and "3" when its content is respectively "1", "2" and "3". The signals for the count values "1" and "3" produced from the mode counter 38 are supplied as gate control signal through an OR gate 39 to AND gate 29, to which the alarm signal AL is supplied. Also, the signals for the count values "2" and "3" from the mode counter are supplied as gate control signal through an OR gate 40 and AND gate 25, to which the alarm signal AL is supplied. The signal for the count value "2" from the mode counter 38 is supplied as gate control signal to AND gate 27. The AND gate 27 supplies the write instruction signal to the recording section 26 while the recording switch S3 is being operated. The voice signal produced from recording section 26 and the music signal produced from music code memory section 30 are supplied to a mixer circuit 41, to which the signal for the count value "3" from the mode counter 38 is supplied, while they are also supplied to respective gate circuits 28 and 31. In the mixer circuit 41, the input voice signal and music signal are mixed not simply but in a parallel or composite way, and the resultant signal is supplied through a gate circuit 42 to microphone-loudspeaker 12. The value "1", "2" and "3" signals from the mode counter 38 open the respective gates 31, 28 and 42.

Thus, when the content of the mode counter 38 is "0", the AND gates 25 and 29 remain closed even when the alarm signal AL is produced from the coincidence detection circuit 7 upon detection of the alarm time. In this case, no alarm sound is thus produced when the alarm time is reached. This means that when the content of the mode counter 38 is set to "0", the alarm sound mode is set.

When the content of the mode counter 38 is set to "1" by operating the alarm sound instruction switch S4, the value "1" signal of the mode counter 38 is supplied through the OR gate 39 to the AND gate 29 and also supplied to the gate circuit 31. Thus, when the alarm time is reached, the read instruction signal is produced from the AND gate 29 and supplied to the music code memory section 30, so that at the alarm time the music memorized in the music code memory section 30 is produced.

When the content of the mode counter 38 is set to "2" by operating the switch S4 and also the recording switch S3 is operated, during the period which the switch S3 is being operated the write instruction signal is produced from the AND gate 27 and supplied to the recording section 26. Thus, the voice supplied from the microphone-loudspeaker 12 is written in the recording section 26. When the alarm time is reached, the value "2", signal of the mode counter 38 is supplied through the OR gate 40 to the AND gate 25, while also it is supplied to the gate circuit 28, so that the voice memorized in the recording section 26 is produced at the alarm time.

When the content of the mode counter 38 is set to "3" by operating the switch S4, the value "3" signal of the mode counter 38 is supplied through the OR gate 39 to the AND gate 29 and also supplied through the OR gate 40 to the AND gate 25. In this state, when the alarm time is reached the read instruction signal is produced from the AND gates 29 and 25 and supplied to the recording section 26 and music code memory section 20. As a result, the voice signal is produced from the recording section 26, while the music signal is produced from the music code memory section 30, these signals being supplied to the mixer circuit 41. Also, with the value "3" signal from the mode counter 38 the mixer circuit 41 is rendered operative, and the gate 42 is opened. Thus, the voice signal and music signal are mixed in the mixer circuit 41, and the resultant sound is produced from the microphone-loudspeaker 12. In this case, the recorded content such as "meeting" is sounded together with the music memorized in the music code memory section 31 as background music.

As has been shown, with this embodiment it is possible to selectively produce either the permanently memorized music or a recorded voice and also simultaneously produce the permanent memorized music and recorded voice.

Figure 12:
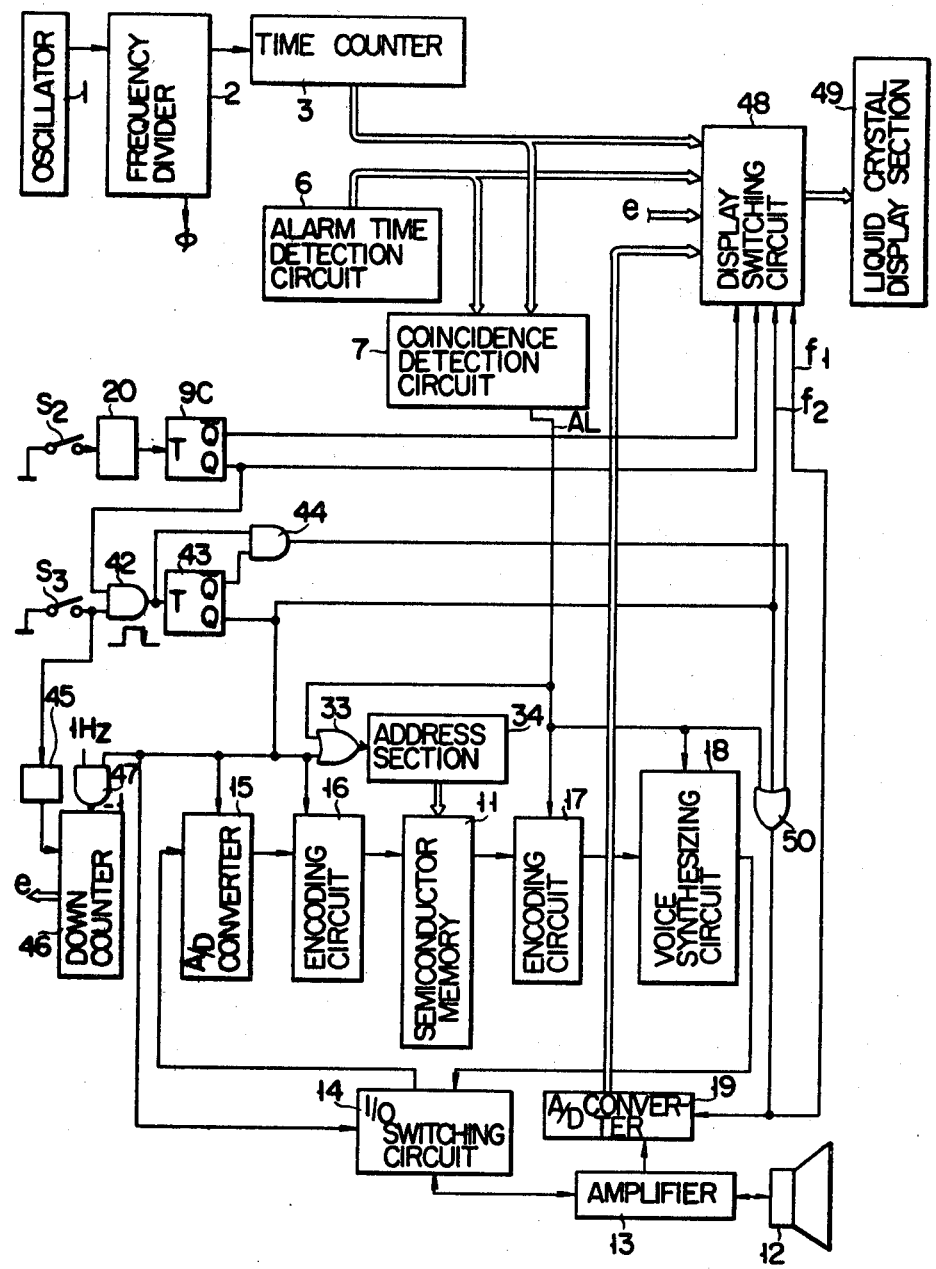
FIG. 12 is a block diagram showing a still further embodiment of the invention.

FIG. 12 shows a further embodiment. The circuit construction of this embodiment of the electronic timepiece is improved in connection with the way of recording voice.

In FIG. 12, the switch operation signal produced when recording switch $S_3$ is operated is supplied through an AND gate 42, to which the Q side output signal of binary flip-flop 9c for the display switching is also supplied, to a T input terminal of a binary flip-flop 43. The flip-flop 43 is constructed such that it is inverted with the falling of a pulse produced from the AND gate 42, and usually it is producing the "1" signal from the $\bar{Q}$ side output terminal. The output signal of the AND gate 42 is supplied to one of the input terminals of an AND gate 44, and the $\bar{Q}$ side output signal of the flip-flop 43 is supplied to the other input terminal of the AND gate 44. The switch operation signal from the recording switch $S_3$ is also supplied to a one-shot circuit 45, and the pulse signal output thereof is supplied as a decimal "8" preset signal to a down-counter 46. The decimal "8" preset in the down-counter 46 is down-counted according to the output of an AND gate 47, to which a 1-Hz signal and the Q side output signal of the binary flip-flop 43 are inputted. As will be described later in detail, the content of down-counter 46 represents the residual recording capacity, and the output content e of the down-counter 46 is supplied through a display control circuit 48 to a display section 49. The Q side output signal of the binary flip-flop 43 is supplied through OR gate 33 to address section 34 to let the address section 34 produce address data. In this way, the address designation of semiconductor memory 11 is effected. The semiconductor memory 11 has a recording capacity corresponding to, for instance, about 8 second.

Meanwhile, the alarm signal produced from the coincidence detection circuit 7 is supplied as operation instruction signal through an OR gate 50 to an A/D converter 19 while it is also supplied as operation instruction signal to the OR gate 33 and also to the encoding circuit 17 and the voice signal synthesizing circuit 18. To the OR gate 50 are also supplied the output signal of an AND gate 44 and the Q side output signal of the binary flip-flop 43. The output signal of the OR gate 50 is supplied as a display switching signal $f_1$ to a display control circuit 48. Also, the Q side output signal of the flip-flop 43 is supplied as another display switching signal $f_2$ to the display control circuit 48. FIG. 13 shows the construction of the display control circuit 48 and a liquid crystal display section 49. In the display control section 48, the PM data obtained from time counter 3 supplied to an AND gate 48a, and the day of a week data is supplied to an AND gate 48b. To the AND gates 48a and 48b is also supplied the $\bar{Q}$ side output signal of the binary flip-flop 9c as gate control signal. The output content of the A/D converter 19 is supplied to an AND gate 48c. To the AND gate 48c are also supplied the Q side output signal of the binary flip-flop 9c and the display switching signal $f_1$ as respective gate control signals. The "hour" data obtained in the time counter 3 is supplied to an AND gate 48d, and the preset "hour" data in the alarm time setting circuit 6 is supplied to an AND circuit 48e. To the AND gate 48d the $\bar{Q}$ side output signal of the binary flip-flop 9c is also supplied as gate control signal, and to the AND gate 48e the Q side output signal of the binary flip-flop 9c and the output of an inverter 48f inverting the display switching signal $f_2$ are also supplied. The output data from the AND gates 48d and 48e are outputted from the display control circuit 48 through an OR gate 48g therein. The "minute" data obtained in the time counter 3 is supplied to an AND gate 48h, the preset "minute" data in the alarm time setting circuit 6 is supplied to an AND gate 48i, and the output data of the down-counter 46 is supplied to an AND gate 48j. To the AND gate 48h is also supplied the $\bar{Q}$ side output signal of the binary flip-flop 9c, to the AND gate 48i is also supplied the Q side output signal of the binary flip-flop 9c, and to the AND gate 48j are supplied the Q side output signal of the binary flip-flop 9c and the display switching signal $f_2$, these signals being supplied as respective gate control signals. The output data from the AND gates 48h, 48i and 48j are outputted from the display control circuit 48 through an OR gate 48k therein.

The liquid crystal display section 49 includes a first digital display section 49a for digitally displaying data about the "hour" as the time unit and a second digital display section 49b for digitally displaying data about the "minute" as the time unit. It further includes an analog display section 49c having eight dot display sub-sections arranged in a row for displaying analog-wise the day of a week, PM data and sound volume data. In the Figure, above the first to seventh dot display sub-sections from the left hand end respective day of a week symbols "SU" (Sunday), "MO" (Monday), "TU" (Tuesday), "WE" (Wednesday), "FR" (Friday) and "SA" (Saturday) are given, and above the right hand end dot display sub-section a symbol "PM" indicating the post medium is given. These symbols are fixed by means of printing. For the sake of convenience, the first to seventh dot display sub-sections from the left hand end in the analog display section 49c is referred to as a first analog display section $48c_1$, and the right hand end dot display section is referred to as a second analog display section $49c_2$.

The operation of the electronic timepiece of FIGS. 12 and 13 having the above construction will now be described with reference to the time chart of FIGS. 14A, 14B and 14C and the display states shown in FIGS. 15A and 15B and 16A, 16B and 16C.

When the $\bar{Q}$ side output signal of the binary flip-flop 9c is "1", the AND gates 48a, 48b and 48c in the display control circuit 48 are opened. Thus, the time data obtained in the time counter 3, i.e., the PM data, day of a week data, "hour" data and "minute" data, are supplied through the AND gates 48a, 48b and 48c to the liquid crystal display section 49. In this way, the liquid crystal display section 49 displays that, for instance, it is "10:30", "Wednesday" and "PM".

When the display select switch $S_2$ is operated, a single pulse is produced from the one-shot circuit 20, the output state of the binary flip-flop 9c is inverted so that the Q side output signal is inverted to "1", thus bringing about the alarm time display mode. In the binary flip-flop 43, the Q side output signal is usually "0", that is, the display switching signal $f_2$ is "0". In this state, the AND gates 48e and 48i in the display control circuit 48 are opened. Thus, the alarm time data output from the alarm time setting circuit 6 is supplied through the display control circuit 48 to the liquid crystal display section 49. Thus, the alarm time, for instance "12:35" is displayed as shown in FIG. 15B.

For making recording in the alarm time display mode, the recording switch $S_3$ is operated. The switch operation signal from the switch $S_3$ is supplied to the one-shot circuit 45 to produce a single pulse. When this pulse signal is produced, "8" is preset in the down-counter 46. The switch operation signal from the switch $S_3$ is also supplied through the AND gate 42 to the T input terminal of the binary flip-flop 43. The binary flip-flop 11 is usually such that the $\bar{Q}$ side output signal is "1", and its output state is inverted as shown in FIG. 14C when the switch $S_3$ is turned "off" as shown in FIG. 14B, that is, with the falling of the pulse from the AND gate 42. Thus, while the AND gate 44 is "on", the output of the AND gate 44 is obtained. The output signal of the AND gate 44 is supplied through the OR gate 50 to the A/D converter 19 to render the converter 19 operative, while it is also supplied as display switching signal $f_1$ to the display control circuit 48. As a result, the AND gate 48c in the display control circuit 48 is opened, so that the output content of the A/D converter 19 is supplied through the display control circuit 48 to the analog display section 49c in the liquid crystal display section 49. Thus, when a voice sound is given with a suitable volume to the microphone-loudspeaker 12, the voice supplied to the microphone-loudspeaker 12 is amplified through the amplifier 13 and then converted through the A/D converter 19 into a digital signal, which is supplied through the display control circuit 48 to the liquid crystal display section 49. If the volume of the voice spoken at this time is high, all the dot display sub-sections in the analog display section 49c in the liquid crystal display section 49 are turned on as shown in FIG. 16A to indicate that the volume is high. If this volume level is too high, the recording is made once again by adjusting the distance between the microphone-loudspeaker 12 and position of emission of voice or the volume of the voice pronounced so that the volume of the voice inputted this time is rendered. In this case, of the dot display sub-sections in the analog display section 49c in the liquid crystal display section 49 the first to the fifth ones from the left hand end, for instance, are turned on as shown in FIG. 16B to indicate that the volume this time is lower than the previous one.

When the adequate distance between the microphone-loudspeaker 12 and position of emission of voice and/or the volume of the voice pronounced for obtaining a desired volume level of the coupled voice are grasped from the observation of the volume level display, the switch $S_3$ is turned off. As a result, the output state of the binary flip-flop 43 is inverted, with the Q side output signal thereof inverted to "1" as shown in FIG. 14C. Thus, address data is produced from the address section 34, and the A/D converter 15 and encoding circuit 16 are rendered operative. In this state, the recording can be made. When what is to be made at the alarm time such as "meeting" or "rendezvous" is correctly spoken to the microphone-loudspeaker 12, the corresponding voice signal produced from the microphone-loudspeaker 12 is digitally converted through the amplifier 13 and I/O switching circuit 14 to the A/D converter 15 and then encoded through the encoding circuit 16 for successive writing. In this way, the voice of such word as "meeting", "rendezvous", etc. is recorded.

Also, during recording the voice signal inputted from the microphone-loudspeaker 12 is supplied through the amplifier 13 and the A/D converter 19, to which the Q side output signal of the binary flip-flop 43 is supplied through the OR gate 50, to the display control circuit 48. Since the display control circuit 48 is given the Q side output signal of the binary flip-flop 9c and the display switching signals $f_1$ and $f_2$, the AND gates 48c and 48j are opened. Thus, the output content of the A/D converter 19 is given to the analog display section 49c of the liquid crystal display section 49, and the volume of the voice is displayed as shown in FIG. 16C.

The output content e of the down-counter 46 is supplied through the AND gate 48j and OR gate 48k of the display control circuit 48 to the second digital display section 49b of the liquid crystal display section 49. Thus, the data "8" preset in the down-counter 46 is displayed as shown in FIG. 16C, indicating that the residual recording capacity of the semiconductor memory 11 is 8 seconds in terms of time. Since the AND gate 47 is opened by the Q side output signal of the binary flip-flop 43, the 1-Hz signal is produced from the AND gate 47 as shown in FIG. 14A. Thus, the preset data "8" in the down-counter 46 is down-counted every time the 1-Hz signal is produced from the AND gate 47, that is, the displayed time period representing the residual recording capacity is reduced from "8" to "7", "6", . . . every time one second is elapsed after other from the start of the recording. This means that the recording can be made reliably without the possibility of partly omitting the recording content if it is made while watching the display.

As has been shown, by coupling trial voice to the microphone-loudspeaker 12 before the start of the recording the volume level of the inputted voice is displayed, so that the recording can be made at a desired input voice level by following the adjusted distance from the microphone-loudspeaker 12 and adjusted volume grasped at the time of the test. Also, the volume of the inputted voice can be indicated digitally by using numerals.

FIG. 17 shows a further embodiment, which is provided with means for permitting the reproduction of the recorded content at the alarm time to be reliably heard. Referring to FIG. 17, the switch operation signal from the recording switch $S_3$ is supplied to an AND gate 42, to which the Q side output signal of binary flip-flop 9c is also supplied. While the recording switch $S_3$ is being operated, the signal produced from the AND gate 42 is supplied as operation designation signal to an amplifier 50, as well as to A/D converter 15 and encoding circuit 16. The amplifier 50 amplifies the voice signal inputted from the outside of the timepiece through a microphone 51, and the amplified voice signal is supplied through the A/D converter 15 and encoding circuit 16 to semiconductor memory 11 to be written therein. The output signal of the AND gate 42 is supplied as read/write (R/W) signal to the semiconductor memory 11, and the semiconductor memory 11 is given the write designation when the output signal of the AND gate 42 is "1" while it is given the read designation when the output signal of the AND gate 42 is "0".

The output signal of the AND gate 42 is further supplied as gate control signal through an OR gate 52 to an AND gate 53, to which the predetermined frequency signal $\phi$ is also supplied from frequency divider 2. The predetermined frequency signal $\phi$ provided from the AND gate 53 is supplied to a +1 input terminal of an address counter 54 to be up-counted thereby. The content of the address counter 54 is supplied as address data to the semiconductor memory 11 and successively specifies the addresses of the semiconductor memory 11 from the first to the last.

Meanwhile, the alarm signal AL produced from coincidence detection circuit 7 is supplied to a set input terminal S of a flip-flop 55. The Q side output signal of the flip-flop 55 is supplied through the OR gate 52 to the AND gate 53, while it is also supplied as gate control signal to an AND gate 56. When the AND gate 56 is held open, a carry signal produced from the address counter 54 is supplied through the AND gate 56 to a 3-scale of counter 57 to be counted therein. The carry signal output of the 3-scale of counter 57 is supplied to a reset side input terminal R of the flip-flop 55, and the $\overline{Q}$ side output signal therefrom is supplied to a reset terminal R of the address counter 54.

The Q side output signal of the flip-flop 55 is supplied as operation designation signal to an encoding circuit 17, a voice signal synthesizing circuit 18 and an amplifier 58. The voice data read out from the semiconductor memory 11 is supplied through the encoding circuit 17 to the voice signal synthesizing circuit 18. The voice signal obtained from the voice signal synthesizing circuit 18 is amplified through an amplifier 58 and then supplied to a loudspeaker 59, which thus produces the voice sound.

The operation of the electronic timepiece of the above construction will now be described with reference to the time chart of FIGS. 18A, 18B, 18C and 18D. When the recording switch $S_3$ is operated, the output of the AND gate 42 is obtained during the period which the AND gate 42 is being operated. With the appearance of the output signal from the AND gate 42 the amplifier 50, A/D converter 15 and encoding circuit 16 are rendered operative, and the semiconductor memory 11 is given the write designation. Also, the AND gate 53 is opened, so that the predetermined frequency signal $\phi$ is provided from the AND gate 53 to cause the counting operation of the address counter 54. In this state, what is scheduled at the alarm time, for instance "prearrangements" in case when the user of the timepiece has a schedule of making prearrangements with his customer, is correctly pronounced to the microphone 51. The voice signal thus inputted to the microphone 51 is amplified through the amplifier 50 and then converted through the A/D converter 15 into a digital signal, which is then encoded through the encoding circuit 16 before being inputted to the semiconductor memory 11. The semiconductor memory 11 is given successive address designations according to the output data of the address counter 54, and the voice data is written in the specified addresses. In this way, the inputted voice pronouncing "prearrangements", etc. is recorded.

When the alarm time is subsequently reached, whereupon the alarm signal AL is produced from the coincidence detection circuit 7 as shown in FIG. 18A, the flip-flop 55 is set, with the Q side output signal thereof inverted to "1" as shown in FIG. 18B. This means that a state of producing the recorded content as the alarm sound at the alarm time is set in. In other words, the AND gate 53 is opened by the Q side output signal from the flip-flop 55, so that the predetermined frequency signal $\phi$ is produced form the AND gate 17 to cause the counting operation of the address counter 54. At this time, the semiconductor memory 11 is in its state of being given the read modification by the output signal "0" of the AND gate 42. Also, with the Q side output signal of the flip-flop 55 the encoding circuit 17, voice synthesizing circuit 18 and amplifier 58 are rendered operative, and the AND gate 56 is opened. Thus, the semiconductor memory 11 is given the address modification according to the output data of the address counter 54, so that the voice data memorized in the specified addresses are read out. The voice data read out from the semiconductor memory 11 are amplified through the amplifier 58 and then inputted to the loudspeaker 59, which thus produces the voice sound. At this time, the recorded content "prearrangements" is repeatedly pronounced with the successive counting-up of the content of the address counter 54 as shown in FIG. 18B.

When the first pronounciation of "prearrangements" is ended, a carry signal is produced from the address counter 54 as shown in FIG. 18C. This carry signal is supplied through the AND gate 56 to the 3-scale of counter 57 to change the content thereof by one. Also with the appearance of the carry signal the content of the address counter 54 is changed to the initial value, so that the semiconductor memory 11 is given the address designation again from the first specified address and thus produces the second pronounciation of the recorded content "prearrangements". In this way, the recorded content "prearrangements" is pronounced three times as shown in FIG. 18B.

When the third pronounciation of the recorded content is ended, the 3-scale of counter 57 produces a carry signal as shown in FIG. 18D, whereupon the flip-flop 55 is reset. As a result, the alarm operation is stopped, and the content of the address counter 54 is reset by the $\overline{Q}$ side output signal of the flip-flop 55.

As has been shown, when the alarm time is reached, the recorded content "prearrangements" is repeatedly pronounced three times. Thus even in case when the first pronounciation has failed to be heard or the content thereof has not been understood even though the pronounciation could be heard, the content, for which the alarm time is set, can be reliably known from the second or third pronounciation.

FIG. 19 shows a modification of the embodiment of FIG. 17. In FIG. 19, like parts as those in FIG. 17 are designated by like reference numerals, and their description is omitted. In this modification, the carry signal produced from address counter 54, which is supplied through AND gate 56 to the 3scale of counter 57 like the case of the embodiment of FIG. 17, is also supplied to a buzzer sound signal generating circuit 60. The buzzer sound signal generating circuit 60 produces a buzzer sound signal every time the carrier signal is connected to it from the address counter 54, and the buzzer sound signal thus produced is supplied to the loudspeaker 59 as shown in FIG. 17 so that a buzzer sound is produced.

In the modification of FIG. 19 the buzzer sound is produced every time the recorded content is pronounced, i.e., after the first, second and third pronounciations of the recorded content. Since the buzzer sound is produced between adjacent pronounciations of the recorded content in this way, it is possible to more effectively prevent the failure of hearing of the recorded content.

While the above embodiment is constructed to repeatedly pronounce the recorded content three times, this number of repetition is by no means limitative. Also, it is possible to provide a constant silent period (for instance one second) between adjacent pronounciations of the recorded content.

FIG. 20 shows a further embodiment, which is provided with means for permitting the reproduced sound to be reliably heard. Referring to FIG. 20, the alarm signal AL produced from coincidence detection circuit 7 is supplied through an OR gate 61 to a set input terminal S of a flip-flop 55.

The carry signal produced from address counter 54 is supplied to a reset input terminal R of the flip-flop 55, and is also supplied to a set input terminal S of the flip-flop 62. The Q side output signal of the flip-flop 62 is supplied as gate control signal to an AND gate 63, to which the 1-Hz signal from frequency divider 2 is also supplied. The 1-Hz signal provided from the AND gate 63 is supplied to a 10-scale of counter 64 to be counted therein. The counter 64 produces a carry signal 10 seconds after the start of its counting operation, and this carry signal is supplied to a reset input terminal of the flip-flop 62.

Designated at $S_5$ is an alarm confirmation switch. The switch operation signal from this switch $S_5$ is supplied to a one-shot circuit 65 to produce a single pulse. This pulse signal is supplied through an AND gate 66, to which the Q side output signal of the flip-flop 62 is supplied as gate control signal, and also through an OR gate 61 to a set input terminal of the flip-flop 55.

The operation of the electronic timepiece of the above construction will now be described with reference to the time chart of FIGS. 21A, 21B, 21C, 21D, 21E, 21F and 21G. What is to be done at the alarm time, for instance, "phonecall" is memorized in the semiconductor memory 11 by operating recording switch $S_3$.

Figure 21:
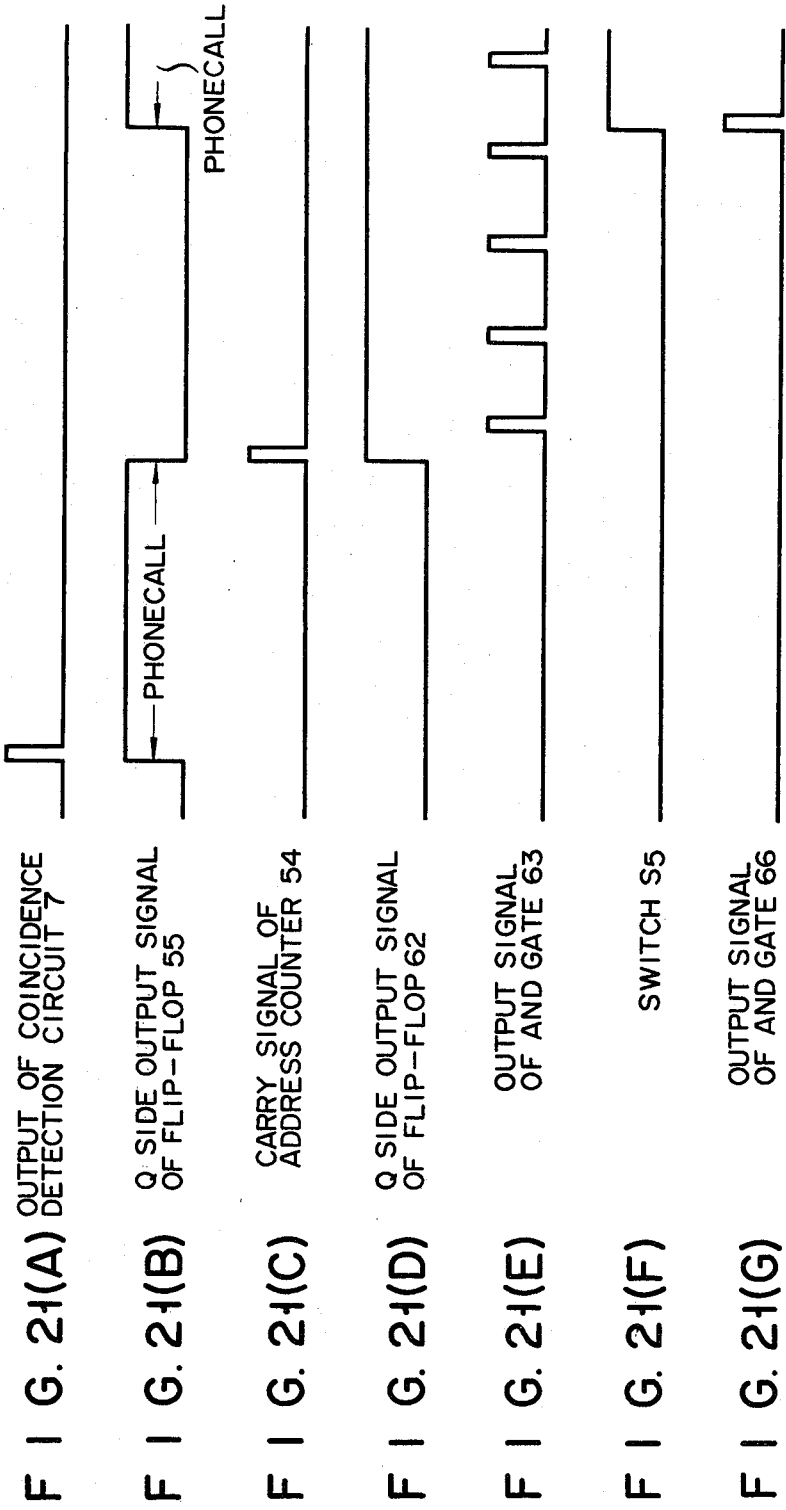

When the alarm time is reached, whereupon the alarm signal AL is obtained from the coincidence detection circuit 7 is produced, the flip-flop 55 is set, with its Q side output signal inverted to "1" as shown in FIG. 21B. With this Q side output signal of the flip-flop 55 the AND gate 53 is opened to cause the counting operation of address counter 54 with the predetermined frequency signal $\phi$ provided from the AND gate 53. As the content of the address counter 54 is successively increased by up-counting, the recorded content "phonecall" is pronounced as shown in FIG. 21B. When the address counter 54 specifies the last address of the semiconductor memory 11, the carry signal is produced as shown in FIG. 21C. This carry signal resets the Q side output signal of the flip-flop 55, causing the $\bar{Q}$ side output signal to be produced therefrom. This brings an end to the operation of pronounciation of the recorded content.

Meanwhile, the carry signal produced from the address counter 54 sets the flip-flop 62, so that the Q side output signal thereof is inverted to "1" as shown in FIG. 21D. As a result, the AND gate 63 is opened, so that the 1-Hz signal is provided from the AND gate 63 as shown in FIG. 21F and counted by the counter 64. At an instant during the counting operation of the counter 64, i.e., before ten seconds is elapsed from the end of the sound production, by operating the alarm confirmation switch $S_5$, i.e., by turning on the switch $S_5$ as shown in FIG. 21F, a pulse is sent from the one-shot circuit 65 to the AND gate 66 as shown in FIG. 21G. This pulse signal is supplied through the OR gate 61 to the flip-flop 55 to set the flip-flop 55 as shown in FIG. 21B. As a result, the recorded content "phonecall" memorized in the semiconductor memory 11 is pronounced again. When the alarm configuration switch $S_5$ is operated again before the lapse of ten seconds from the end of the second pronounciation, the recorded content "phonecall" is pronounced again. In the above way, the pronounciation of the recorded content can be caused a desired number of times by operating the alarm confirmation switch $S_5$ within ten seconds from the end of the previous pronounciation.

After the lapse of ten seconds from the end of the operation of pronounciation, the 10-scale of counter 64 produces the carry signal to reset the flip-flop 62. With the resetting of the flip-flop 62 the AND gate 66 is closed. In this state, even by operating the alarm confirmation switch $S_5$ no output is obtained from the AND gate 66, so that the flip-flop 55 remains in the reset state. Thus, in this state the recorded content is not reproduced.

As has been shown, in case when part or all of the recorded content pronounced at the alarm time fails to be heard, it is possible to cause the pronounciation of the recorded content again by operating the alarm confirmation switch $S_5$ before the lapse of ten seconds from the end of the previous pronounciation.

FIG. 22 shows a further embodiment, in which the recorded content is reproduced for every flat time (such as "1:00" and "12:00" which are zero minute and zero second past the given hour).

Referring to FIG. 22, time counter 3 consists of a minute counter 3a and an hour counter 3b. The contents of the minute and hour counters 3a and 3b are supplied to a display switching circuit 75. The content of the minute counter 3a is also supplied to a zero minute detection circuit 70, which produces a one-shot signal by detecting zero minute, and the content of the hour counter 3b is supplied to an AND gate 71, to which the one-shot signal from the zero minute detection circuit 70 is also supplied.

Meanwhile, the switch operation signal of display select switch $S_1$ is supplied to a one-shot circuit 20 to produce a single pulse for setting a display selection flip-flop 72. The Q side output signal of the flip-flop 72 is supplied as gate control signal to an AND gate 73, to which a 0.5-Hz signal is supplied from frequency divider 2. The 0.5-Hz signal from the AND gate 73 is counted by a 24-scale of counter 74. A carry signal produced from this counter 74 resets the display selection flip-flop 72. The Q side output signal of the display switching flip-flop 72 is supplied to a display switching control circuit 75. The display switching circuit 75 is constructed such that it couples the minute and hour data from the minute and hour counters 3a and 3b when the Q side output signal from the display switching flip-flop 72 is "0" while it couples the content of the 24-scale of counter 74 when the aforementioned Q side output signal is "1".

The switch operation signal from the recording switch $S_3$, which is supplied to amplifier 50, A/D converter 15, encoding circuit 16 and semiconductor memory 11, is also supplied to an OR gate 52 and to the one-shot circuit 75. The pulse signal produced from the one-shot circuit 75 is supplied as gate control signal to an AND gate 69, to which the content of the 24-scale of counter 74 is supplied. The output data from the AND gate 71, to which the hour data from the hour counter 3b is supplied, and the AND gate 76 are supplied through an OR gate 77 to a decoder 78, and the decoded data therefrom is given as preset address data in address counter 54. The semiconductor memory 11, to which the content of the address counter 54 is supplied as address data, has 24 equal memory areas for 0 to 24 o'clock respectively. These 24 memory areas of the semiconductor memory 11 are selected according to the content of the decocer 78. These memory areas are successively address specified every time the content of the address counter 54 is increased by +1. When the last memory area address is specified, a pulse is produced from the semiconductor memory 11 to reset a sound production control flip-flop 79. The flip-flop 79 is set by a pulse produced from the zero minute detection circuit 70, and the Q side output signal of the flip-flop 79 is supplied to an encoding circuit 17, voice signal synthesizing circuit 18 and amplifier 58 and is also supplied as gate control signal f through an OR gate 52 to an AND gate 53.

The operation of the embodiment of FIG. 22 having the above construction will now be described with reference to the time chart of FIGS. 23A, 23B, 23C and 23D and the display states of FIGS. 24, 25A and 25B. When the display selection flip-flop 72 is in the reset state, the minute and hour data from the minute and hour counters $3a$ and $3b$ are supplied through the display switching control circuit 75 to a liquid crystal display unit 76 and displayed therein as, for instance, "10:50" as shown in FIG. $24a$.

When the display select switch $S_1$ is operated in this state, a pulse is produced from the one-shot circuit 20 to set the display selection flip-flop 72 as shown in FIG. 23A. As a result, the Q side output signal of the display selection flip-flop 72 is inverted to "1" as shown in FIG. 23B, so that the content of the 24-scale of counter 74 is supplied through the display switching control circuit 75 to the liquid crystal display section 76, so that zero hour "0:" is displayed as shown in (b) in FIG. 24. Also, with the Q side output signal of the display selection flip-flop 72 the AND gate 73 is opened, so that the 0.5-Hz signal is provided from the AND gate 73 as shown in FIG. 23C. Thus, the content of the 24-scale of counter 74 is increased according to the 0.5-Hz signal from the AND gate 73 and successively supplied to the liquid crystal display section 76. Consequently, numerals "1", "2", "3", ... representing the respective hours are successively displayed in the liquid crystal display section 76 each for two seconds; for example figures "5", ..., "8", ..., "23" are displayed as shown in (c), (d) and (e) in FIG. 24.

In the above state in which successive hours are displayed, by operating the recording switch $S_3$ for the period, during which the desired hour data is displayed, the scheduled item for that hour can be recorded. For example, when the baseball training is scheduled at 5 o'clock, during the two seconds, during which the display of the hour data for 5 o'clock is displayed, the recording switch $S_3$ is operated, and at this time the voice "baseball" is inputted. At this time, the switch operation signal from the switch $S_3$ is obtained as shown in FIG. 23D, and a pulse is produced from the one-shot circuit 75 to open the AND gate 76. As a result, the data "5" preset in the 24-scale of counter 74 is supplied through the AND gate 69 and OR gate 77 to the decoder 78 for decoding therein, and the decoded data is set as initial address data in the address counter 54. Also, with the operation of the recording switch $S_3$ the amplifier 50, A/D converter 15 and encoding circuit 16 are rendered operative, and with the clock signal $\phi$ provided from the AND gate 53 the counting operation of the address counter 54 is started. In this state, by correctly pronouncing "baseball", for instance, which is scheduled to be made at 5 o'clock, to the microphone 51, the voice data from the encoding circuit 16 is written in the memory area corresponding to 5 o'clock. In this way, the voice "baseball" is memorized.

Likewise, when a "meeting" is scheduled at 8 o'clock, the recording switch $S_3$ is operated during the period of display of the hour data of 8 o'clock as shown in FIG. $24(d)$, and the "meeting" is correctly pronounced to the microphone 21. By so doing, the coupled voice "meeting" is recorded in the memory area of the semiconductor memory 11 corresponding to 8 o'clock. In the above way, the schedule from 0 o'clock to 23 o'clock can be recorded. When 23 o'clock is passed, the carry signal is produced from the 24-scale of counter 74, whereby the usual time display is recovered.

Then, every time when a flat hour is reached, the zero minute detection circuit 70 detects the zero minute data "00" of the minute counter $3a$ and produces a pulse. With this pulse signal the AND gate 71 is opened, and the sound production control flip-flop 79 is set. As a result, the hour data of the hour counter $3b$ is supplied through the AND gate 71 and OR gate 77 to the decoder 78 and is set in the address counter 54. Also, with the Q side output signal of the flip-flop 79 the encoding circuit 17, voice synthesizing circuit 58 and amplifier 58 are rendered operative, and with the clock signal $\phi$ from the AND gate 53 the counting operation of the address counter 54 is started. Thus, when the flat time "5:00", for instance, is reached, the hour data for 5 o'clock from the hour counter $3a$ through the AND gate 71 and OR gate 77 to the decoder 78 for decoding, and the output data therefrom is set as initial address data in the address counter 54. Consequently, the memory area of the semiconductor memory 11 corresponding to 5 o'clock is given address designation. For this memory area corresponding to 5 o'clock the address shift is made every time the content of the address counter 54 is increased by +1. Thus, the voice data memorized in the memory area corresponding to 5 o'clock is successively read out according to the address designation and supplied through the encoding circuit 17, voice signal synthesizing circuit 18 and amplifier 58 to the loudspeaker 59 for reproduction therefrom. Thus, when 5 o'clock is reached as shown in FIG. 25A, the recorded content "baseball" is pronounced to inform of the fact that the baseball is scheduled at 5 o'clock. Likewise, when 8 o'clock is reached as shown in FIG. 25B, the recorded content "meeting" is pronounced to inform of the fact that the meeting is scheduled at 8 o'clock. When the reproduction of the voice "baseball" or "meeting" is ended with the designation of the last address of the memory area corresponding to 5 to 8 o'clock, a pulse is produced from the semiconductor memory 11 to reset the sound production control flip-flop 79. With the resetting of the flip-flop 79 the operation of sound production is stopped.

As has been shown, since the scheduled item for every hour can be recorded by externally coupling voice and the recorded content corresponding to each hour is pronounced at the flat time of that hour, the scheduled item for that hour can be known at the corresponding flat time. Also, since the recording is made according to the hour display which is changed for every two seconds, the recording of the schedule of even the whole day can be made in a short period of time, i.e., in 48 seconds. Thus, the recording operation is very simple.

While in the above embodiment the recorded content is pronounced at the flat time, it is also possible to let the recorded content be pronounced after an alarm sound such as a buzzer sound is produced. Doing so is effective for inciting the attention of the user of the timepiece and also has an effect of giving a time alarm.

FIG. 26 shows a further embodiment of the invention applied to an electronic timepiece, in which the time is displayed by optical pointer display. In this embodiment, the time data obtained from time counter 3 is supplied through a display switching circuit 80 to a liquid crystal display section 81. The display section 81 includes a circular central display member 81a, sixty inner needle display members 81b radially arranged on the central display member 81a at a uniform spacing and sixty outer needle display members 81c each disposed on the extension of each inner rod display member 81b. The inner display members 81b are used to display the hour data of the time data of the time counter 3, and both the inner and outer display members 81b and 81c are sued to display the minute data. The periphery of the display section 81 is provided with twelve time mark lines respectively indicating 0 to 11 o'clocks and also with clockwise and counterclockwise arcular arrows symmetrically drawn with respect to the time mark line for 0 o'clock. Further, characters "MEMORY" are printed at a position ahead of the clockwise arrow, and characters "LEVEL" are printed at a position ahead of the counterclockwise arrow.

The switch operation signal from recording switch $S_3$ is supplied through a one-shot circuit 9c to an AND gate 83, to which the Q side output signal of flip-flop 9c is also supplied, and the output signal of the AND gate 83 is supplied to a switch control section 84. As will be described later in detail, the switch control section 84 is constructed such that when the pulse signal from the AND gate 83 is supplied thereto, it produces a control signal $f_1$ and also it produces a control signal $f_2$ after the lapse of four seconds from the generation of the control signal $f_1$. The pulse signal from the AND gate 83 is also supplied to a down-counter 46. When the pulse signal from the AND gate 83 is received, a decimal number "20" is preset in the down-counter 46. The preset data "20" in the down-counter 46 is down-counted according to the 1-Hz signal supplied through an AND circuit 47. The AND gate 47 is opened according to the control signal $f_2$ from the switch control section 84. After the lapse of 20 seconds from the start of the counting operating the down-counter 46 produces a borrow signal which is supplied to the switch control section 84. The content of the down-counter 46 represents the residual recording capacity, and the output data d from the downcounter 46 is supplied through the display switching circuit 80 to the display section 81.

The control signal $f_2$ from the switch control section 84 is supplied through OR gate 33 to produce address data, and it is also supplied as operation designation signal to A/D converter 15 and encoding circuit 16 and also supplied as write/read (R/W) signal to semiconductor memory 11. The semiconductor memory 11 has a recording capacity corresponding to a recording period of about 20 seconds.

The control signal $f_2$ from the switch control section 84 and the alarm signal AL from the coincidence detection circuit 7 are supplied as operation designation signal through an OR circuit 85 to an A/D converter 19. The A/D converter 19 converts the amplified voice signal output of amplifier 13 which is an analog signal, to a digital signal, which is supplied as volume data through the display switching circuit 80 to the display section 81.

Meanwhile, the control signals $f_1$ and $f_2$ from the switch control section 84 and the alarm signal AL from the display switching circuit 80 are supplied as display control signal to the display switching circuit 80. The control signals $f_1$ and $f_2$ cause the display switching circuit 80 to couple the output data e of the down-counter 46 and the output data of the A/D converter 19 to the display section 81 for display therein, and the alarm signal AL causes the display switching circuit 80 to couple the output data of the A/D converter 19 to the display section 81 for the level display therein.

The control signal $f_1$ from the switch control section 84 is further supplied as operation designation signal to a buzzer sound signal generating circuit 86 and also supplied as gate clear signal to a gate 87. It is further supplied through an inverter 88 to a gate 89. The buzzer sound signal generating circuit 86 produces a predetermined buzzer sound signal, which is supplied through the gate 87 to loudspeaker 12.

FIG. 27 shows the circuit construction of the switch control section 84 in detail. The pulse signal from the AND gate 83 sets a flip-flop 84a. The Q side output signal of the flip-flop 84a is outputted as the control signal $f_1$ from the switch control section 84, while it is also supplied as gate clear signal to an AND gate 84b, to which a 2-Hz signal is supplied. The 2-Hz signal provided from the AND gate 84b is supplied to a 8-scale of counter 84c and counter therein. Thus after the lapse of four seconds from the start of its counting operation the 8-scale of counter 84c produces a carry signal to reset the flip-flop 84a. The pulse signal from the AND gate 83 and also the borrow signal from the down-counter 46 are supplied through an OR gate 84d to a binary flip-flop 84e to invert the output state thereof. The Q side output signal of the flip-flop 84e is supplied to an AND gate 84f, to which the $\bar{Q}$ side output signal of the flip-flop 84a is inputted, and the output signal of the AND gate 84f is outputted as the control signal $f_2$.

The operation of the electronic timepiece of FIG. 26 having the above construction will now be described with reference to FIGS. 28 through 33A and 33B. When the $\bar{Q}$ side output signal of the binary flip-flop 9c is "1", the time data from the time counter 3 is outputted through the display switching circuit 80, and it is displayed on the display section 81, for instance as "6:16", in FIG. 28. For recording a voice, switch $S_1$ is operated to invert the output state of the flip-flop 9c so that the Q side output signal thereof is "1". As a result, the alarm time data memorized in the alarm time setting circuit 6 is supplied through the display switching circuit 80 to the display section 81 and is displayed therein as anglogwise pointer display. When the recording switch $S_3$ is operated in this state, a pulse is supplied from the one-shot circuit 82 through the AND gate 83. The pulse signal provided from the AND gate 83 is supplied to the switch control section 84 and also to the down-counter 46 to preset the down-counter 46 to "20". Meanwhile, in the switch control section 84 the flip-flop 84a is set so that its Q side output signal is supplied as the control signal $f_1$. At the same time the AND gate 84b is opened to let the 2-Hz signal be supplied through the AND gate 84b to the 8 scale of counter 84e to be counted therein. Further, the output state of the flip-flop 84e is inverted to let the Q side output signal thereof open the AND gate 84f. When the control signal $f_1$ is produced from the switch control section 12, the display switching circuit 80 supplies the output data d of the down-counter 46 and the output data of the A/D converter 19 to the display unit 81. Thus, in the display section 81 of the inner and outer display members 81b and 81c those which are found in an area from 0 to 20 minutes are turned on as shown in FIG. 29, indicating that the residual recording capacity of the semiconductor memory 11 corresponds to 20 seconds. The shaded areas shown in FIGS. 29, 30, 31, 32 and 33B indicate that all the display members that are found in these areas are "on". For four seconds from the operation of the recording switch S$_3$ the control signal f$_1$ is produced, and with this signal the buzzer sound signal generating circuit 86 is rendered operative while the gate 87 is opened. Thus, a buzzer sound signal at a predetermined frequency is produced from the buzzer sound signal generating circuit 86 and supplied through the gate 87 to the loudspeaker 12 to produce the buzzer sound. This buzzer sound informs of the recording state.

After the lapse of four seconds from the start of the counting operation, the 8-scale of counter 84c produces a carry signal to set the flip-flop 84c. As a result, the $\bar{Q}$ side output signal is produced from the flip-flop 84a, and the control signal f$_2$ is produced from the AND gate 84f. With the appearance of the control signal f$_2$ the recording state is set in: that is, the semiconductor memory 11 is given the write designation, address data is produced from the address section 34, the I/O switching circuit 14 is rendered to act as the input circuit, and the A/D converter 15 and encoding circuit 16 are rendered operative. In this state, the scheduled item such as "meeting", "prearrangements", "rendezvous", etc. is correctly pronounced to the microphone-loudspeaker 12. As a result, the microphone-loudspeaker 12 produces the corresponding voice signal, which is supplied through the gate 89, amplifier 13 and I/O switching circuit 14 to the A/D converter 15, and the output therefrom is supplied through the encoding circuit 18 to the semiconductor memory 11 to be memorized there.

Meanwhile, with the appearance of the control signal f$_2$ the AND gate 47 is opened. As a result, the 1-Hz signal is produced from the AND gate 14, whereby the preset content "20" in the down-counter 46 is successively reduced by down-counting. The output data of the down-counter 46 is supplied through the display switching circuit 80 to the display section 81. Thus, when nine seconds, for instance, have elapsed, the inner and outer display members 81b and 81c found in an area between the 0 and 11 minute mark lines are held "on" as shown in FIG. 30, so as to indicate that the residual recording capacity of the semiconductor memory 11 corresponds to 11 seconds. The voice signal from the microphone-loudspeaker 12 is amplified by the amplifier 13 and then supplied to the A/D converter 19 for conversion into a digital signal, which is supplied through the display switching circuit 80 to the display section 81 to be displayed therein. Thus, in the display section 81, the inner display members 81b those found in an area between the 38 and 0 minute mark lines are turned on as shown in FIG. 30. In this way, the volume level of the inputted voice is optically displayed.

When 20 1-Hz signals have been produced from the AND gate 47 to reduce the content of the down-counter 46 to "0", i.e., to reduce the residual recording capacity to "0", the down-counter 46 produces a borrow signal. As a result, in the switch control section 84 the borrow signal from the down-counter 46 is supplied through the OR gate 84d to the flip-flop 84e to invert the output state thereof so as to close the AND gate 84f. Thus, the control signal f$_2$ vanishes, so that the recording operation is stopped.

As has been shown, the displayed area representing the residual recording capacity is reduced in the direction of arrow in FIG. 30 with the lapse of time, so that the residual recording capacity can be known in terms of the corresponding time period from the display. Also, since the volume level of the inputted voice is displayed in the left hand area of the display surface in FIG. 30, it is possible to record the voice at an adequate volume level.

When the alarm time is reached so that the alarm signal AL is produced from the coincidence detection circuit 7, the recorded content is pronounced. The operation of this pronounciation refers to FIG. 12.

FIGS. 31 through 33A and 33B show other examples of the arrangement for displaying the volume level and residual recording capacity. In the example of FIG. 31, the volume level is displayed in the upper half of the display surface, and the residual recording capacity is displayed in the lower half of the display surface. For the volume level the display area is expanded in the directions of arrows with the increase of the level, while for the residual recording capacity the display area is reduced in the directions of arrows with the reduction of the residual capacity.

In the example of FIG. 32, all the inner display members 81b are used to display the volume level, and all the outer display members 81c are used to display the residual recording capacity. In this case, with the reduction of the volume level the volume level display area is reduced in the direction of arrow a, and with the reduction of the residual recording capacity display area is reduced in the direction of arrow b.

In the examples of FIGS. 33A and 33B the second data is displayed as analog-wise pointer display in addition to the display of the hour and minute data. In this case, sixty outermost display members 81d are provided on the outer side of the inner and outer display members 81b and 81c, and they are used to display the second data as the analog-wise pointer display. Thus, the time is displayed as shown in FIG. 33A, which indicates three o'clock, zero minute and thirty-five seconds. The volume level is displayed by the inner display members 81b, the residual recording capacity is displayed by the outer display members 81c, and the record quantity which is complementary to the residual recording capacity is displayed by the outermost display members as shown in FIG. 33B. The volume level display area is reduced in the direction of arrow a with the reduction of the volume level, the residual recording capacity display area is reduced in the direction of arrow b with the reduction of the residual recording capacity, and the record quantity display area is expanded such that it is complementary to the reduction of the residual recording capacity display area.

While the embodiments described above have concerned with what is called PCM system, in which the inputted voice data is written in a semiconductor memory, the same effects according to the invention may also be obtained with other recording systems such as DM, ADM, DPCM, L(log)PCM, APCM, ADPCM, LPC and PARCO systems.

Also, while the above embodiments have concerned with electronic timepieces, the invention can also be applicable to a small-sized electronic computer or the like incorporating timepiece functions.

Further, while in the above embodiments the recorded content is pronounced at a preset time or a flat time which is zero minutes and zero seconds past a given hour, this is by no means limitative, and it is possible to arrange that the recorded content is pronounced on a preset day.

What we claim is:
1. An electronic timepiece comprising:
   time counter means for counting a reference frequency signal to form time data;

time display means coupled to said time counter means for displaying said time data;
first converting means for converting an externally provided voice sound into voice data;
a semiconductor memory coupled to said first converting means for storing said voice data;
address assigning means coupled to said semiconductor memory for sequentially assigning addresses of said semiconductor memory;
second converting means coupled to said semiconductor memory for converting said voice data stored in said semiconductor memory into a voice signal;
voice reproducing means coupled to said second converting means for generating a voice sound in accordance with said voice signal;
externally operable switch means for enabling said semiconductor memory to store said voice data;
voice data writing instructing means coupled to said externally operable switch means and to said address assigning means for supplying a writing instruction signal, generated by operating said externally operable switch means, to said address assigning means and to said first converting means to enable storing of said voice data from said first converting means in said semiconductor memory;
alarm signal generating means coupled to said time counter means for generating an alarm signal when said time data coincides with a predetermined alarm time; and
voice readout control means coupled to said alarm signal generating means for supplying said alarm signal as a readout instruction signal to said address assigning means and to said second converting means to enable said second converting means to convert said voice data stored in said semiconductor memory into said voice signal so that said voice reproducing means generates a voice sound corresponding to said voice signal.

2. An electronic timepiece comprising:
time counter means for counting a reference frequency signal to form time data;
time display means coupled to said time counter means for displaying said time data;
first converting means for converting an externally provided voice sound into voice data;
a semiconductor memory coupled to said first converting means for storing said voice data;
address assigning means coupled to said semiconductor memory for sequentially assigning addresses of said semiconductor memory;
second converting means coupled to said semiconductor memory for converting said voice data stored in said semiconductor memory into a voice signal;
voice reproducing means coupled to said second converting means for generating a voice sound in accordance with said voice signal;
voice data writing instructing means coupled to said address assigning means for supplying a writing instruction signal to said address assigning means and to said first converting means to enable storing of said voice data from said first converting means in said semiconductor memory;
notice sound generating means for producing a notice sound informing of the start of the writing of voice data under the control of said voice data writing instructing means before said voice data writing instructing means produces said writing instruction signal;
alarm signal generating means coupled to said time counter means for generating an alarm signal when said time data coincides with a predetermined alarm time; and
voice readout control means coupled to said alarm signal generating means for supplying said alarm signal as a readout instruction signal to said address assigning means and to said second converting means to enable said second converting means to convert said voice data stored in said semiconductor memory into said voice signal so that said voice reproducing means generates a voice sound corresponding to said voice signal.

3. An electronic timepiece according to claim 1 or 2, further comprising a predetermined sound memory means for permanently memorizing predetermined sounds; and an alarm sound specifying means for selectively specifying to said voice readout control means to convert data stored in said semiconductor memory or said predetermined sound memory means to produce corresponding audible sounds.

4. An electronic timepiece according to claim 3, wherein said predetermined sound memorized in said predetermined sound memory means comprises a piece of music.

5. An electronic timepiece according to claim 3, wherein said semiconductor memory comprises a random access memory (RAM), and wherein said predetermined sound memory means comprises a read only memory (ROM).

6. An electronic timepiece according to claim 3, which further comprises an alarm sound display means coupled to said alarm sound specifying means for displaying the state of selection of either said semiconductor memory or said predetermined sound memory means from which to generate said audible sounds responsive to said alarm signal.

7. An electronic timepiece according to claim 1, which further comprises a notice sound generating means for producing a notice sound informing of the start of the writing of voice data under the control of said voice data writing instructing means before said voice data writing instructing means produces said writing instruction signal.

8. An electronic timepiece according to claim 1 or 2, which further comprises a sound volume level display means for optically displaying the volume level of said externally provided voice sound.

9. An electronic timepiece according to claim 1 or 2, wherein said semiconductor memory is a random access memory (RAM).

10. An electronic timepiece according to claim 1 or 2, which further comprises a memory capacity display means coupled to said semiconductor memory for displaying the residual memory capacity of said semiconductor memory.

11. An electronic timepiece according to claim 1 or 2, wherein said time display means comprises an analog display means for displaying at least hour and minute data as an optical pointer display, and said analog display means includes a volume level change display means for optically displaying the changes of the volume level of the said externally provided voice sound.

12. An electronic timepiece according to claim 1 or 2, wherein said time display means comprises an analog display means for displaying at least hour and minute data as an optical pointer display, and said analog display means includes a memory capacity change display means coupled to said semiconductor memory for displaying the changes of the memory capacity of said semiconductor memory.

13. An electronic timepiece according to claim 1 or 2, wherein said voice reproducing means repeatedly reproduces given voice sounds at least twice.

14. An electronic timepiece according to claim 1 or 2, wherein said externally operable switch means allows for repeated reproduction of voice sounds from said voice reproducing means at said predetermined alarm time.

15. An electronic timepiece according to claim 1 or 2, which further comprises a writing display means for informing of the start of writing of the voice data by said voice data writing instructing means.

16. An electronic timepiece according to claim 1 or 2, wherein said voice reproducing means includes a loudspeaker, said loudspeaker also serving as a microphone for receiving said externally provided voice sound.

17. An electronic timepiece according to claim 1 or 2, wherein said alarm signal generating means includes an alarm time memory section for memorizing an alarm time and a coincidence detection means for detecting the coincidence of the alarm time memorized in said alarm time memory section and current time data obtained from said time counter means.

18. An electronic timepiece according to claim 1 or 2, wherein said alarm signal generating means includes a detecting means for detecting a flat time which is zero minutes and zero seconds past a given hour represented by the time data obtained from said time counter means.

* * * * *

UNITED STATES PATENT AND TRADEMARK OFFICE
CERTIFICATE OF CORRECTION

PATENT NO. : 4,391,530
DATED : July 5, 1983
INVENTOR(S) : Wakabayashi et al

It is certified that error appears in the above-identified patent and that said Letters Patent is hereby corrected as shown below:

Title page, left-hand column, under "Foreign Application Priority Data", change "54-126264" to read -- 54-123264 --

Signed and Sealed this

Eighth Day of November, 1988

*Attest:*

DONALD J. QUIGG

*Attesting Officer*  *Commissioner of Patents and Trademarks*